United States Patent
Mimura et al.

(10) Patent No.: US 6,557,031 B1
(45) Date of Patent: Apr. 29, 2003

(54) TRANSPORT PROTOCOL CONVERSION METHOD AND PROTOCOL CONVERSION EQUIPMENT

(75) Inventors: Itaru Mimura, Sayama (JP); Toshiaki Suzuki, Kokubunji (JP); Koichi Shibata, Kamakura (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/148,326

(22) Filed: Sep. 4, 1998

(30) Foreign Application Priority Data

Sep. 5, 1997 (JP) ............................. 9-240677
Sep. 5, 1997 (JP) ............................. 9-240678

(51) Int. Cl.[7] ......................... G06F 15/16; H04N 7/173
(52) U.S. Cl. ....................... 709/218; 709/230; 709/236; 709/246; 709/249; 725/109; 725/110; 725/118
(58) Field of Search ................................. 709/203, 218, 709/217, 230, 219, 249, 246, 236; 710/33; 348/7; 725/148, 149, 63–72, 86–104, 105–134

(56) References Cited

U.S. PATENT DOCUMENTS

| | | | | |
|---|---|---|---|---|
| 5,761,602 A | * | 6/1998 | Wagner et al. ............... 455/3.1 |
| 5,790,753 A | * | 8/1998 | Krishnamoorthy et al. . 709/203 |
| 5,847,751 A | * | 12/1998 | Safadi ........................... 348/7 |
| 5,881,245 A | * | 3/1999 | Thompson .................. 709/218 |
| 5,941,959 A | * | 8/1999 | Fishler et al. ................. 710/33 |
| 5,987,518 A | * | 11/1999 | Gotwald ..................... 709/230 |
| 5,991,800 A | * | 11/1999 | Burke et al. ................ 709/218 |
| 6,006,257 A | * | 12/1999 | Slezak ........................ 709/219 |
| 6,018,767 A | * | 1/2000 | Fijolek et al. .............. 709/218 |
| 6,018,768 A | * | 1/2000 | Ullman et al. .............. 709/218 |
| 6,032,180 A | * | 2/2000 | Nishikawa ................... 709/217 |
| 6,112,232 A | * | 8/2000 | Shahar et al. ............... 709/217 |
| 6,185,737 B1 | * | 2/2001 | Northcutt et al. ........... 725/110 |

FOREIGN PATENT DOCUMENTS

WO 9720413 6/1997

OTHER PUBLICATIONS

M. Kumar, et al "A High Performance Video Server for Broadband Network Environment" Proceedings of the SPIE, Bellingham, VA, vol. 2667, Jan. 29, 1996, pp. 410–421.

* cited by examiner

Primary Examiner—Kenneth R. Coulter
Assistant Examiner—Paul Kang
(74) Attorney, Agent, or Firm—Antonelli, Terry, Stout & Kraus, LLP

(57) ABSTRACT

A transfer protocol conversion method and a protocol conversion equipment are disclosed in order to transmits TS packets for a CATV network, a DAVIC network or the like by use of IP packets for the Internet. In a network using TS packets, the transmission is made with an Internet protocol header stored in a private field of an adaptation field defined in the TS packet. An equipment for protocol conversion between a network using TS packets and an Internet forms an IP packet for the Internet by use of the header transferred by the private data. Further, lower 8 bits of the IP address of an IP packet and lower 8 bits of the PID value of a TS packet are made the same and upper 24 bits of the IP address are converted into a 5-bit value so that the converted 5-bit value is made to correspond to upper 5 bits of the PID value.

1 Claim, 19 Drawing Sheets

FIG. 18
| IP ADDRESS (UPPER 24BITS) | NETWORK NUMBER (5BITS) | QAM No. |
|---|---|---|
| 128.155.30.XXX | 1(00001) | 1 |
| 128.155.40.XXX | 2(00010) | 2 |
| . . . | ... | ... |
| 128.155.80.XXX | 30(11110) | 3 |
FIG. 19
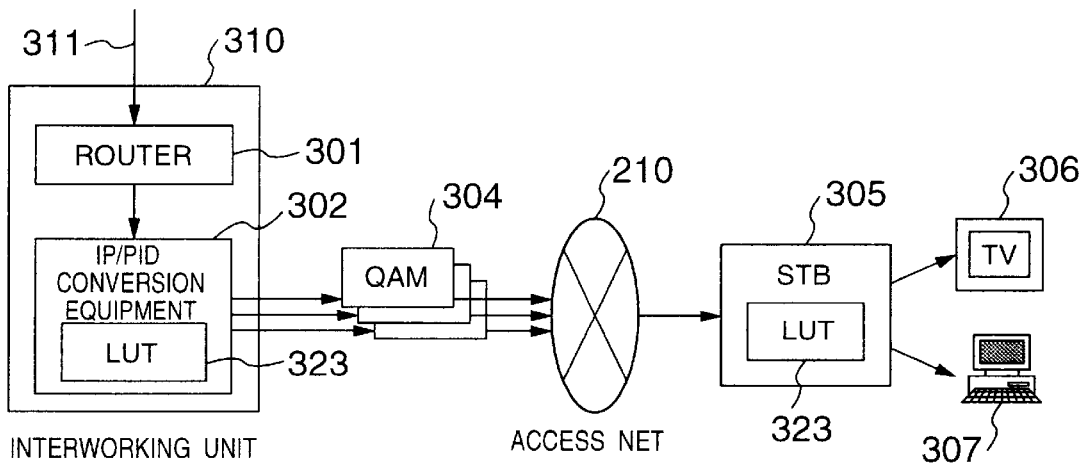
FIG. 20
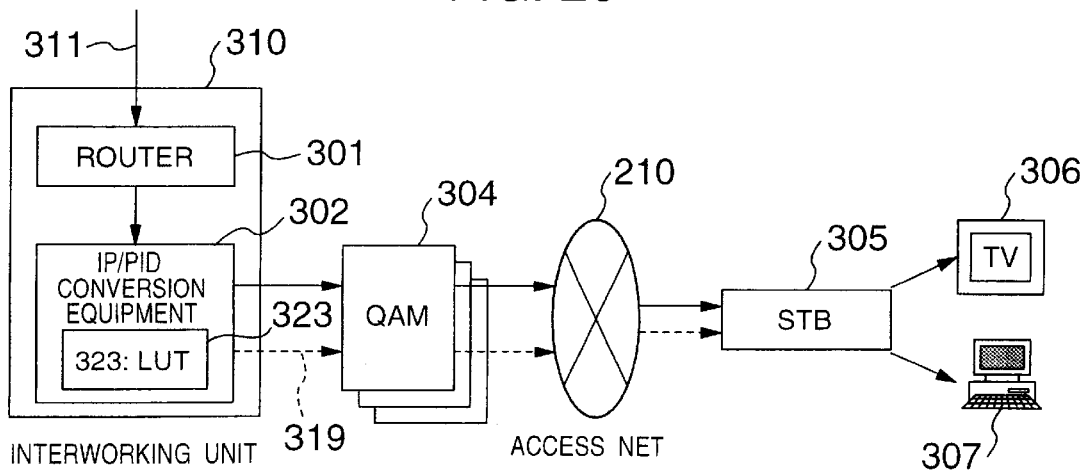

FIG. 22

| IP ADDRESS (UPPER 24BITS) | NETWORK NUMBER (3BITS) | QAM No. |
|---|---|---|
| 128.155.30.XXX | 0(000) | 1 |
| 128.155.40.XXX | 1(001) | 1 |
| . . . | ... | ... |
| 128.155.80.XXX | 7(111) | 3 |

FIG. 24

| IP ADDRESS (UPPER 24BITS) | NETWORK NUMBER (2BITS) | QAM No. |
|---|---|---|
| 128.155.30.XXX | 0(00) | 1 |
| 128.155.40.XXX | 1(01) | 1 |
| . . . | ... | ... |
| 128.155.80.XXX | 3(11) | 3 |

FIG. 25

| DATA CATEGORY | CATEGORY NUMBER (3BITS) |
|---|---|
| AUDIO | 1(001) |
| VIDEO | 2(010) |
| . . . | ... |
| PMT | 6(110) |

TRANSPORT PROTOCOL CONVERSION METHOD AND PROTOCOL CONVERSION EQUIPMENT

BACKGROUND OF THE INVENTION

The present invention relates to a method and system for transmitting an MPEG (Moving Picture Experts Group) image by use of the Internet Protocol (hereinafter referred to as IP). More particularly, the present invention relates to a network connection method using a transmission system conversion equipment for performing a rapid processing for conversion between an MPEG transport protocol and the Internet Protocol and a method for encapsulation of MPEG data to be transmitted. Also, the present invention relates to a method/equipment in which the conversion between an IP address and the PID (Packet Identifier) value of a TS (Transport Stream) packet is performed when a video signal transmitted using the Internet Protocol (IP) is to be transmitted by use of the H.222.0 system and a video transmission system which uses such a method/equipment.

As an international standard for a system for transmitting a video signal in a digitally coded form, "GENERIC CODING OF MOVING PICTURES AND ASSOCIATED AUDIO: SYSTEMS" has been prescribed as ISO (International Organization for Standard)/IEC(International Electrotechnical Commission) 13818-1, ITU-T (International Telecommunication Union-Telecommunication Standardization Sector) H.222.0 Recommendation. This international standard for MPEG system (hereinafter referred to as H.222.0) has prescribed a standard for transmitting a video signal compressed on the basis of an MPEG system. Therein, two kinds of formats have been prescribed. One is a program stream (hereinafter abbreviated to PS) format supposing the transmission from a storage medium or the like for which the generation of bit error is relatively less. The other is a transport stream (hereinafter abbreviated to TS) format supposing a communication network for which the generation of transmission bit error is forecast.

Since in a code conversion system when a compressed or coded video signal is to be transmitted in a TS format, a brief description will be provided of conventional apparatus of a video transmission system based on the TS format. In an MPEG system the object of which is the coding and transmission of video and audio signals, an inputted video signal such as a television signal is digitized and the obtained digital signal is subjected to data compression by use of techniques including discrete cosine conversion, variable-length coding, and so forth. Though techniques used in conjunction with an audio signal are different from those in the case of the video signal, the audio signal is compressed by removing redundant data after digitization. The compressed signal is termed an elementary stream (hereinafter abbreviated to ES) and is data which forms an elementary part of the video/audio signal in conformity with the term. In the MPEG, this video/audio data is represented using the term of (bit) stream.

In a cable television or community antenna television (CATV), satellite communication network, asynchronous transfer mode transmission network (hereinafter abbreviated to ATM network) or the like in which an MPEG video signal is transmitted, it is supposed that the generation of bit error at the time of data transmission is relatively frequent. Therefore, an elementary stream (ES) is transmitted in a form partitioned into small packets in order to narrow a range over which a trouble caused by transmission error extends. The packetized elementary stream (hereinafter abbreviated to PES) has a format in which header information called PES header is added to ES. In the transmission in the communication network exemplified above, PES is transmitted with a form further partitioned into smaller 188-byte packets called transport stream (TS) packets. As shown in FIG. 13, the TS packet includes a 4-byte header and a 184-byte payload for storing data. FIG. 14 shows the structure of the header of the TS packet. The TS header is composed of a 1-byte synchronization byte (Ox47) 133, a flag 134 representative of the attribute of the TS packet (the explanation of the contents of the flag will be omitted since they are not important to the present invention), 13-bit packet identifiers (hereinafter abbreviated to PID) 135 and 136, a scramble control identifier 137, an adaptation field identifier 138, and a 4-bit cyclic counter 139 used for checking the continuity of the packet. In the transport stream, a field called adaptation field can be transmitted prior to a data field which is called payload and is used for storing video data. A program clock reference (hereinafter abbreviated to PCR) aiming at the clock synchronization of the system and private data can be stored in the adaptation field. It is prescribed that when the adaptation field is transmitted using the TS packet, the existence of the adaptation field should be designated by an adaptation field identifier in the TS header.

Though the MPEG system is a system developed corresponding to CATV or digital satellite broadcasting, a service utilizing an MPEG image is recently provided by a network called the Internet having grown with the main object of data communication between computers. In order to ensure the interconnectability of communication in the Internet, the Internet Engineering Task Force (hereinafter abbreviated to IETF) is pushing on standardization. For the standard of an MPEG video transmission format, Request for Comment No. 2038: "RTP Payload Format for MPEG1/MPEG2 Video" (hereinafter abbreviated to RFC 2038) has standardized a transmission method and a packet encapsulation system. It is prescribed by RFC 2038 that the transmission should be made with ES, TS or PS of MPEG utilized as the format of a packet to be transmitted and that in order to prevent the degradation of resolution from being caused by transmission delay, the transmission should be made in accordance with "RTP: A Transport Protocol for Real-Time Applications" (hereinafter abbreviated to RTP) specified by RFC 1889. It is prescribed that an RTP packet should be stored in a packet based on a user datagram protocol (hereinafter abbreviated to UDP) and this UDP packet should be transmitted by use of the Internet Protocol packet (hereinafter abbreviated to IP packet). With the prior art described above, it is possible to transmit MPEG video data in such a manner that MPEG-TS packets are used in the CATV network while IP packets are used in the Internet.

A system for performing video transmission on the basis of an MPEG-TS system includes a digital satellite broadcasting system and a digital CATV system, as mentioned above. The digital CATV system of those services is a service closely related with an area. Generally, the digital CATV system is constructed with a relatively narrow area taken as a service providing area. Therefore, each CATV business proprietor possesses a CATV center (hereinafter referred to as head end) for delivering programs or contents and an access network for transmitting a video signal so that a ground/satellite broadcasting program received at the head end is retransmitted and/or programs or video contents stored in the head end are transmitted, as required. In such a conventional CATV service, it is required that programs other than broadcast programs should be stored in, for example, VTR or the like and reproduced in accordance with delivering schedule. In a video-on-demand (VOD) service or the like expected as a near-future CATV service, too, it is general that the service is structured in a form in which a digital compression signal of a program is held at a head end in a manner similar to that mentioned above. The video-on-demand service has a problem that a service maintenance cost including the purchase of a rebroadcasting right (or copyright) of video contents in order to hold the video contents, a digital compression processing for the video contents, the storage of compressed or coded video, and so forth is expensive and hence it is not commercially profitable unless the number of times of access to the same contents is made as large as possible. An effective method for solving this problem is such that a plurality of CATV business proprietors hold video contents in cooperation and the contents are utilized through the transmission thereof using a communication network when necessary.

The structuring of such a system has a need to connect the head ends and networks of the plurality of CATV business proprietors by the communication network. In order to connect, for example, a CATV head end in U.S.A. and a set top box (hereinafter abbreviated to STB) in Japan which is a video receiver equipment of a CATV subscriber, it is required that the connection should be made utilizing at least a communication network between U.S.A. and Japan. Under present conditions, however, it is not practical that MPEG-TS being generally utilized in the digital CATV is transmitted as it is. Namely, the video transmission based on MPEG-TS has a problem that a dedicated communication network such as ATM network, satellite network or the like must be used and the charge for communication using this dedicated network is expensive. Also, the dedicated network premises the utilization thereof with a contract point kept in a normally connected condition and hence a great problem is offered in the cost performance aspect in the case where there is used for a service in which the network is occupied in accordance with user's requests as in the demand-on-service.

SUMMARY OF THE INVENTION

An object of the present invention is to enable video transmission based on an MPEG-TS packet without using such a dedicated network.

To solve the above problems, apparatus for connecting a plurality of CATV networks by the Internet is used in the present invention. The Internet is a network ramified over the whole world and has a feature that a dynamic change in connection is possible by using an address applied to an individual client or host computer. Namely, there is no need to fix a connection point beforehand or the connection is effected by use of an address when video transmission is desired. Therefore, free connection setting and low-cost video communication incapable of being realized by the dedicated network are possible. Though the existing Internet has a problem that a transmission band width or the like is narrow, it can easily be foreseen that the insufficiency of band will be eliminated in the near future by ensuring a transmission band by a giga bit router, a resource reservation setup protocol (RSVP) or the like, whereby a global network environment can be realized by the Internet.

A problem arising newly when the CATV networks are connected by use of the Internet, as mentioned above, that is, the problem of a need of the protocol conversion between an MPEG transport protocol used in the CATV network and an IP protocol used in the Internet can be solved by providing an interworking unit for performing the conversion between the MPEG-TS protocol and the Internet protocol. Requirements for a high-speed and low-cost processing in the interworking unit can be met by providing apparatus for improving a packet forming method and a packet conversion method for packets to be transmitted in the MPEG network and the IP network.

More particularly, there are used (1) packet forming apparatus with which the transmission is made with the header of an IP packet stored in a private data region of an adaptation field prescribed in the MPEG-TS system and the interworking unit makes no analysis of private data of the adaptation region or causes the private data to transmit in the Internet with the private data used as the header of the IP packet as it is, and (2) apparatus with which when an MPEG video signal is transmitted from the Internet, the transmission is made with the provision of the condition that an IP packet to be transmitted is restricted in size so that it can be accommodated into a payload without the remainder when the IP packet is divided into MPEG-TS packets.

In this case, the video stream in the MPEG-TS packet is distinguished by a PID value. In the IP packet, on the other hand, the video stream is distinguished by an IP address. Accordingly, when the MPEG-TS packet is to be transferred by use of the IP packet, there is a need to make the conversion between the PID value and the IP address by use of any method.

Another object of the present invention is to solve a problem arising in the case where an IP packet of a video signal transmitted in an IP format is received and the received signal is transmitted in a TS-packetized form. This problem will now be described taking a video transmission system as an example. In a video transmission system utilizing the Internet, video data is transmitted from a video server to a client in an IP format with the data stored in an IP packet. In the case where the transmission/reception is thus made with the IP packet left as it is, the transmission/reception is possible irrespective of the inner data format of the IP packet if the transmitting side and the receiving side recognize the transmission format of data. On the other hand, in the case where there are interconnected a network in which the transmission/reception of a video signal is made in such a TS packet format as prescribed by, for example, the DAVIC (Digital Audio Visual Council) specification (hereinafter, referred to as DAVIC network) or the like and an IP network in which the transmission/reception is made in the IP packet format and access from an STB (Set Top Box) connected to the DAVIC network to a server connected to the IP network is made to receive video data, it is required that video data outputted from the server in an IP packet format should be transmitted to the DAVIC network after the conversion to a TS packet format. In the network using the TS packet, a desired packet is received on the basis of a system in which a packet is broadcast to the network with an address or rather packet identifier (PID) applied to the packet and a client wanting that packet selectively receives that packet in dependence on the PID. Since the TS packet is thus distinguished by the PID value, the following problem arises when IP of an IP packet is terminated for TS packetization. Namely, if there is no correspondence for conversion between an IP address and a PID value, it becomes impossible for an STB on the receiving side to make the judgement of which PID does a TS packet to be received possess.

In other words, the object of the present invention is to provide a method and equipment for conversion between an IP address and a PID value required in the case where IP-packetized video data is received and the received data is retransmitted in a TS-packetized form.

As first apparatus for attaining the above object, the present invention is characterized in that the value of lower 8 bits (Bit: 7-0) of an IP address and the value of lower 8 bits (Bit: 7-0) of a PID value are made the same, and upper 24 bits (Bit: 31-8) of the IP address are degenerated into 5 bits so that the degenerated 5 bits are made to correspond to upper 5 bits (Bit: 12-8) of the PID value. The term of "degenerated" or "degeneracy" used herein means the conversion of, for example, a 24-bit value into a 5-bit value. In the case where a channel, for example, as described, a frequency for transmission of the TS packet is different, it is possible to set the same degeneracy value (5 bits).

As second apparatus, the present invention is characterized in that the,value of lower 8 bits (Bit: 7-0) of an IP address and the value of lower 8 bits (Bit: 7-0) of a PID value are made the same, and upper 24 bits (Bit: 31-8) of the IP address are degenerated into a 5-bit value of 1 to 30 excepting 0 and 31 so that the degenerated 5 bits are made to correspond to upper 5 bits (Bit: 12-8) of the PID value.

As third apparatus, the present invention is characterized in that the value of lower 8 bits (Bit: 7-0) of an IP address and the value of lower 8 bits (Bit: 7-0) of a PID value are made the same, upper 24 bits (Bit: 31-8) of the IP address are degenerated into 3 bits so that the degenerated 3 bits are made to correspond to bits 10 to 8 of the PID value, and bits 12 and 11 of the PID value are made to correspond to 1 and 0, respectively.

As fourth apparatus, the present invention is characterized in that the value of lower 8 bits (Bit: 7-0) of an IP address and the value of lower 8 bits (Bit: 7-0) of a PID value are made the same, upper 24 bits (Bit: 31-8) of the IP address are degenerated into 2 bits so that the degenerated 2 bits are made to correspond to bits 9 to 8 of the PID value, and bits 12 to 10 of the PID value are made to correspond to the category of data transmitted by an IP packet.

As fifth apparatus, the present invention is characterized in that the value of lower 8 bits (Bit: 7-0) of an IP address and the value of lower 8 bits (Bit: 7-0) of a PID value are made the same, upper 24 bits (Bit: 31-8) of the IP address are degenerated into 2 bits so that the degenerated 2 bits are made to correspond to bits 9 to 8 of the PID value, and the conversion into a 3-bit value of 1 to 6 excepting 0 and 7 is made for each category of data transmitted by an IP packet so that the converted 3-bit value is made to correspond to 3 bits including bits 12 to 10 of the PID value.

As sixth apparatus, the present invention is characterized in that a device for receiving IP-packetized video data and retransmitting it after TS-packetization transmits data indicative of the correspondence for conversion between an IP address and a PID value in a form multiplexed with retransmission video data to a video data receiving device.

As seventh apparatus, the present invention is characterized in that data indicative of the correspondence for conversion between an IP address and a PID value generated by the method according to any one of the first to fifth apparatuses is transmitted to a video data receiving device each time an IP packet having a different IP address is received and is TS-packetized.

As eighth means, the present invention is characterized in that a retransmitting device transmits data indicative of the correspondence for conversion between an IP address and a PID value generated by the method according to any one of the first to fifth apparatuses and data indicative of the correspondence between the IP address and a frequency number for multiplexing of TS packet to a video data receiving device each time an IP packet having a different IP address is received and is TS-packetized.

As ninth means, the present invention is characterized in that a device for receiving IP-packetized video data and retransmitting it after TS-packetization and a device for receiving the TS-packetized and retransmitted video data hold data-indicative of the correspondence for conversion between an IP address and a PID value beforehand.

As tenth means, the present invention is characterized in that a device for receiving IP-packetized video data and retransmitting it after TS-packetization and a device for receiving the TS-packetized and retransmitted video data hold data indicative of the correspondence for conversion between an IP address and a PID value generated by the, method according to any one of the first to fifth appartuses beforehand.

As eleventh apparatus, the present invention is characterized in that a device for receiving IP-packetized video data and retransmitting it after TS-packetization and a device for receiving the TS-packetized and retransmitted video data hold data indicative of the correspondence for conversion between an IP address and a PID value generated by the method according to any one of the first to fifth apparatuses and data indicative of the correspondence between the IP address and a frequency number for multiplexing of TS packet beforehand.

As twelfth apparatus, the present invention is characterized by comprising means apparatuses with which a device for receiving IP-packetized video data and retransmitting it after TS-packetization and a device for receiving the TS-packetized and retransmitted video data hold data indicative of the correspondence for conversion between an IP address and a PID value generated by the method, according to any one of the first to fifth apparatuses and data indicative of the correspondence between the IP address and a frequency number for multiplexing of TS packet beforehand, and the retransmitting device can transmits the video data after the IP packet to TS packet conversion on the basis of the data indicative of the correspondence between the IP address and a frequency number for multiplexing of TS packet so that the video data is transmitted to that one of a plurality of connected post-stage transmitting devices which is designated by the data.

BRIEF DESCRIPTION OF THE DRAWINGS

FIG. 18 is a diagram showing the correspondence between upper 24 bits of the IP address and 5 bits as a network number in the embodiment shown in FIG. 16;

FIG. 19 is a diagram showing the construction of an embodiment of a network construction in which both a data transmitting interworking unit and a data receiving STB hold data indicative of the correspondence for conversion between an IP address and a PID value, thereby realizing the transmission/reception of data;

FIG. 20 is a diagram showing the construction of an embodiment of a network construction in which a data transmitting interworking unit transmits data indicative of the correspondence for conversion between an IP address and a PID value to a data receiving STB, thereby realizing the transmission/reception of data;

FIG. 22 is a diagram showing the correspondence between upper 24 bits of the IP address and 3 bits as a network number in the other embodiment of the present invention;

FIG. 24 is a diagram showing the correspondence between upper 24 bits of the IP address and 2 bits as a network number in the further embodiment of the present invention;

FIG. 25 is a diagram showing the correspondence between a data category and 3 bits as a category number in the further embodiment of the present invention.

DESCRIPTION OF THE PREFERRED EMBODIMENTS

Embodiments of the present invention will now be described in detail by use of the drawings.

(First Embodiment)

Figure 9:
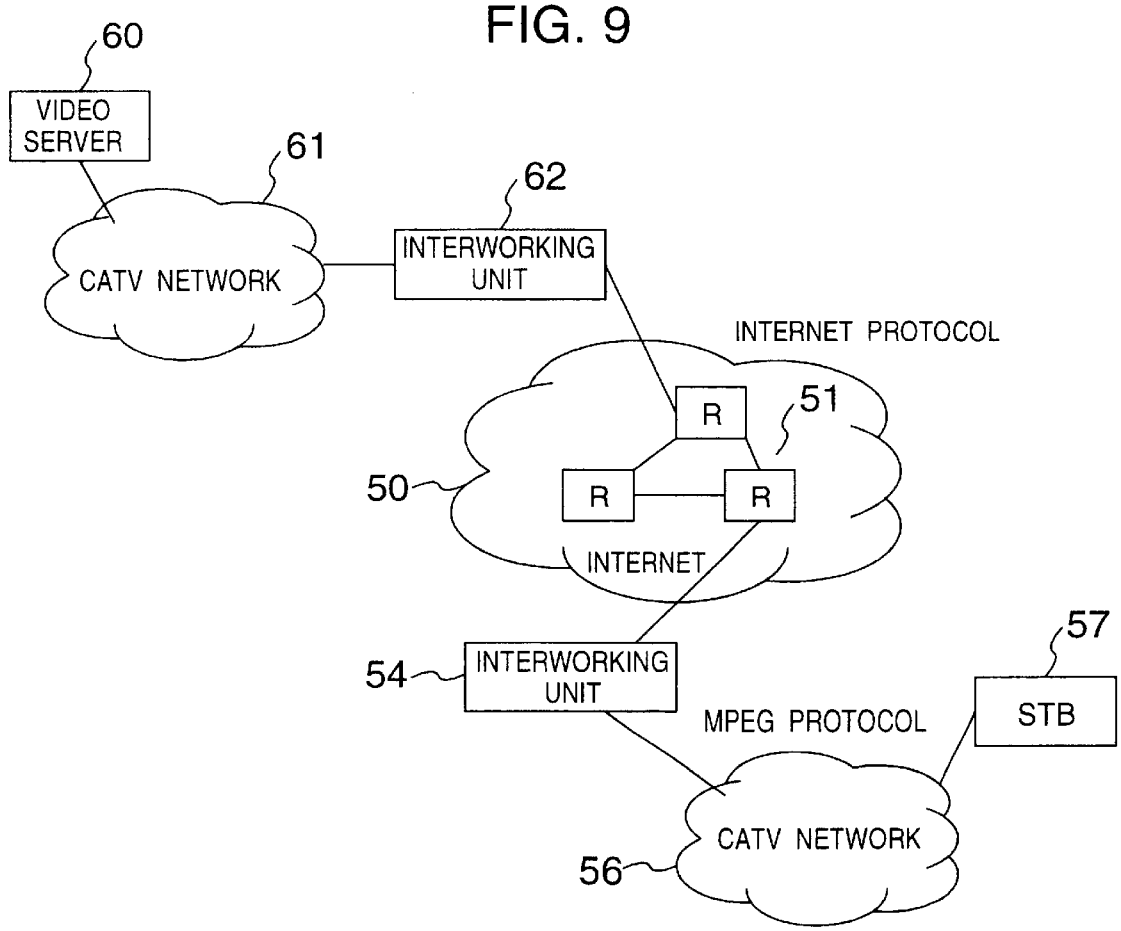
FIG. 9 is a diagram showing an embodiment of a network construction in which two CATV networks are Internet-connected.

FIG. 9 shows an embodiment representing the connection configuration of a CATV system according to the present invention. This CATV system is characterized in that CATV networks 61 and 56 at two locations are connected by the Internet 50. As shown, this CATV system includes a video server 60, the first CATV network 61 connected to the video server 60, the Internet 50, an interworking unit 62 for connecting the Internet 50 and the CATV network 61, the second CATV network 56, and an interworking unit 54 for connecting the CATV network 56 and the Internet 50. An STB (Set Top Box) 57 for receiving a video signal is connected to the CATV network 56. A video signal from the video server 60 is transmitted to the Internet 50 through the interworking unit 62 and is sent to the interworking unit 54 by means of a router network 51. The interworking unit 54 supplies the video signal transmitted using the Internet to the CATV network 56, thereby enabling video reception at the STB 57.

Brief description will now be made of the function of the interworking unit. In the CATV network, a video signal is transmitted on the basis of an MPEG-TS system, as having already been described in the paragraph of BACKGROUND OF THE INVENTION. In the Internet, on the other hand, video transmission based on an Internet protocol represented by RFC 2038 is performed. The interworking unit 62 for interconnecting such networks with different protocols has a function of converting a video signal transmitted on the basis of the MPEG-TS protocol into a format conformable to the Internet protocol. On the other hand, the interworking unit 54 has a function of converting a video signal transmitted on the basis of the Internet protocol into a format based on the MPEG-TS protocol. With the connection of the different CATV networks through the Internet by use of such interworking units 62 and 54, there can be realized a novel function that the video server and the STB on the CATV networks far away in distance from each other can easily be connected. With this construction using the Internet which is a network developed over the whole world, there is obtained a great effect that the connectability between video servers and STB's over the whole world can be ensured.

In the embodiment shown in FIG. 9, the description has been made taking the video server as an example of a device for generation or supply of a video signal. However, the gist of the present invention lies in that a video signal supplied on the basis of the MPEG-TS protocol is transmitted through the Internet. Accordingly, the signal supply source is not limited to only the video server. MPEG signal supplying devices other than the video server include a real-time MPEG encoder and a receiving equipment which receives satellite broadcasting to output an MPEG signal. It is needless to say that the gist of the present invention is satisfied by those devices, too.

For simplification, the present embodiment has been described in conjunction with the example in which different CATV networks at two locations are interconnected. However, it is needless to say that CATV systems at two or more locations may be connected to the Internet. The gist of the present invention lies in that a signal transmitted on the basis of the MPEG-TS system by use of an interworking unit is converted into a format capable of being transmitted by the Internet so that the converted signal is transmitted by the Internet and that a signal transmitted by use of the Internet is converted into an MPEG-TS signal again by an interworking unit so that the converted signal is transmitted to a CATV network.

(Second Embodiment)

In conjunction with a second embodiment, there are disclosed a common video transfer protocol in which the video transmission from a server on the Internet to a STB on a CATV network and the video transmission from a video server on a CATV network to a client's personal computer (PC) on the Internet are taken into consideration in addition to the CATV connection through the Internet described in conjunction with the first embodiment as well as a system with which protocol conversion between different networks is performed.

Figure 8:
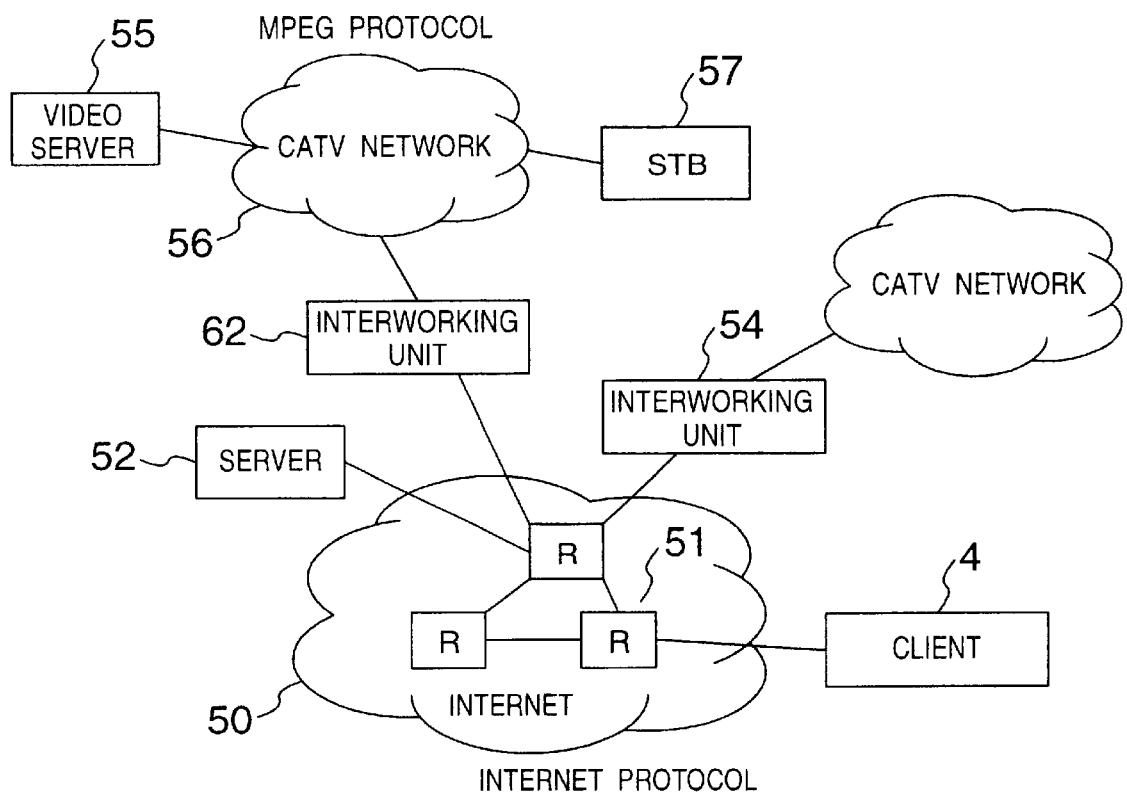
FIG. 8 is a diagram showing an embodiment of a system in which CATV networks are connected by use of the Internet.

FIG. 8 shows a connection diagram in a network construction which enables both the video transmission from a video server 55 on a CATV network 56 to a client 4 on the Internet 50 and the video transmission from a server 52 on the Internet 50 to an STB 57 on the CATV network 56.

First, description will be made of the case where a video signal is transmitted to the client 4 on the Internet from the video server 55 connected to the CATV network 56. The packetization and protocol conversion at the time of video transmission from the server on the Internet to the STB on the CATV network will be described in detail later on in conjunction with a fourth embodiment.

Figure 1:
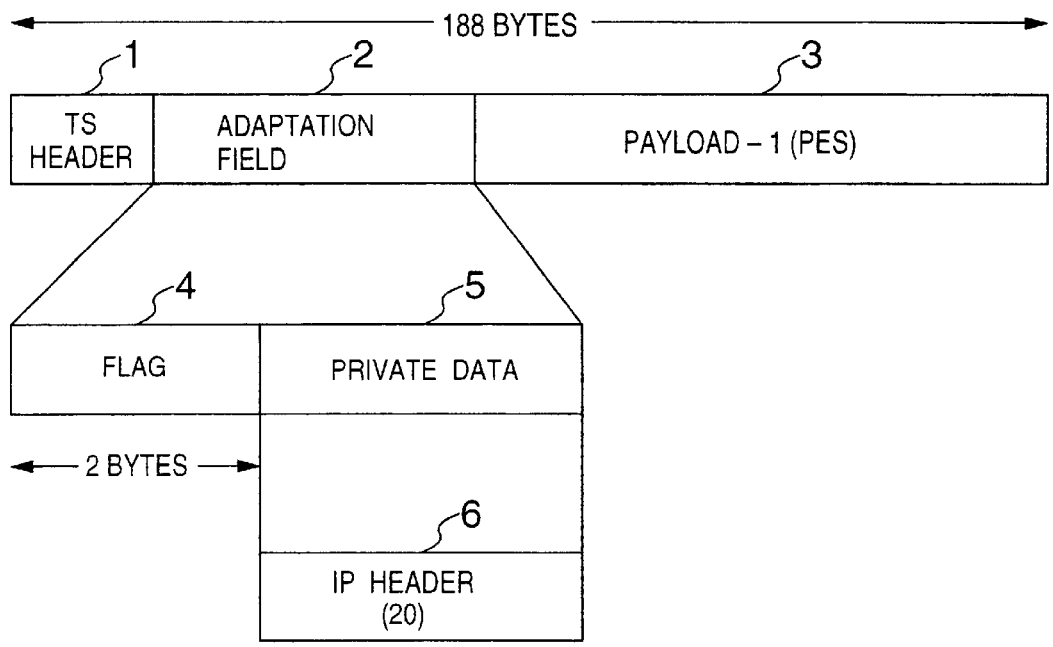
FIG. 1 is a diagram showing an embodiment of a system in which the transmission is made with an IP header encapsulated into an MPEG-TS packet.

In the case of video transmission from the video server 55 to the client 4, the video server 55 transmits a video signal with a packet construction shown in FIG. 1. This video signal reaches an interworking unit 62 on the basis of an MPEG-TS system through the CATV network 56. The interworking unit 62 receives the video signal sent thereto on the basis of the MPEG-TS system to protocol-convert it through a predetermined conversion system (which will be mentioned later on) into packets transmissible on the basis of the Internet protocol and transmits the converted signal to the Internet 50. The Internet 50 sends the video signal to the client 4 by use of the Internet protocol. This signal can be transmitted to an interworking unit 54 by a manner similar to that at the time of transmission to the client 4. In the case of interconnection of CATV networks, protocol conversion to MPEG-TS is made again by the interworking unit 54.

Figure 7:
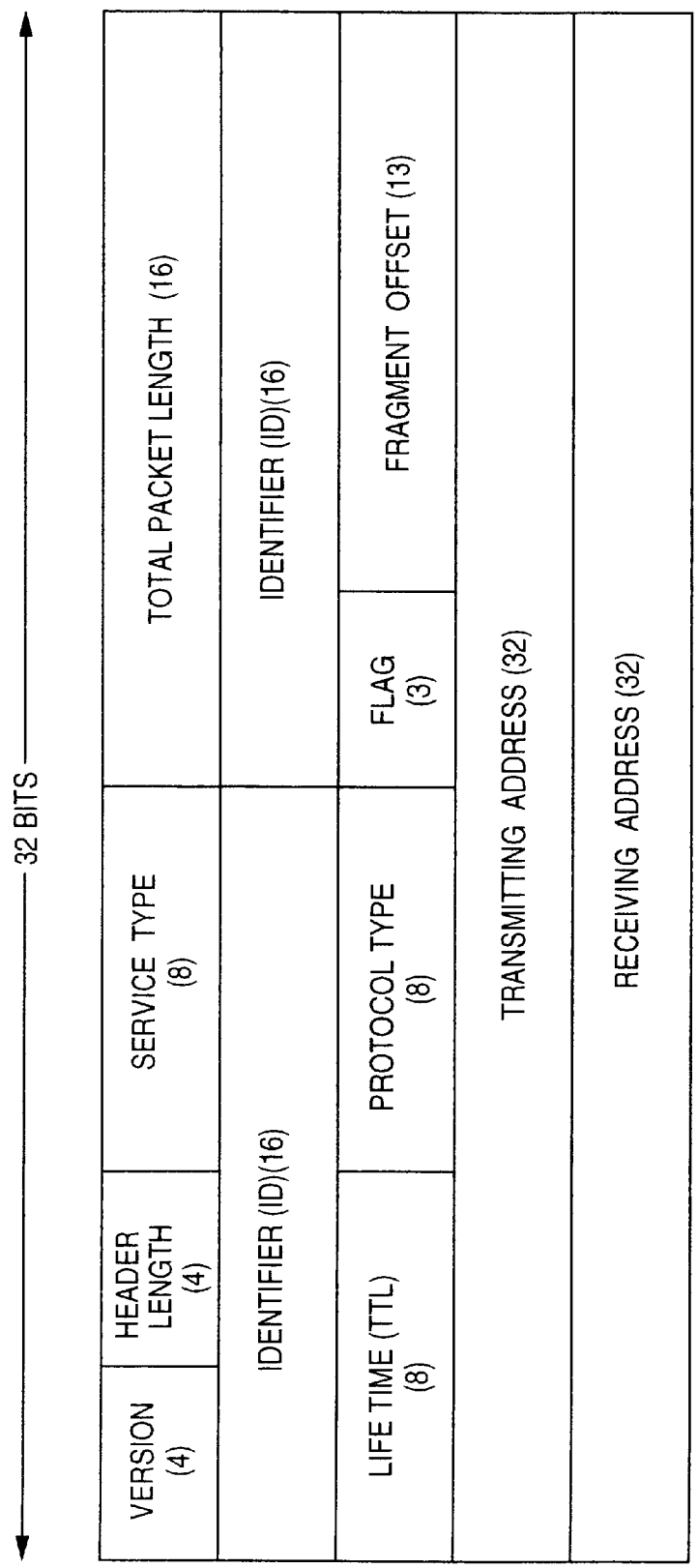
FIG. 7 is a diagram for explaining the structure of an IP packet header.

Now, a method for packet encapsulation shown in FIG. 1 will be described in detail. FIG. 1 corresponds to an embodiment showing the construction of an MPEG-TS signal to be transmitted from the video server 55 (see FIG. 8) to the Internet 50, the STB 57 connected to the CATV network 56 and an STB on another CATV network connected through the interworking unit 54. In MPEG-TS, there are permitted the case where a payload having data stored therein is transmitted subsequently to a 4-byte TS header 1 and the case where an adaptation field 2 is transmitted prior to the payload. In the present invention, in the case where a signal is transmitted to an IP network, a TS including the transmission of an IP header is such that the adaptation field 2 is inserted always immediately after the TS header and the IP header is transmitted using this adaptation field 2, as shown in FIG. 1. The adaptation field 2 is stored with a 2-byte flag 4 indicative of the contents of data to be transmitted and private data 5. In order to transmit the private data 5, the transmission of the private data 5 is indicated by a transport private data flag or a flag indicative of the contents of the adaptation field and the size of the private data 5 is set as a transport private data length in the flag. A 20-byte IP packet header 6 is stored as the private data 5 in a bit arrangement as it is. FIG. 7 is a diagram showing the contents of the IP packet header stored as such private data 5. The IP packet header is composed of a 4-bit field indicative of a version, a header length, a service type, a total packet length, identifiers, a source IP address and a destination IP address. In the case where there is no option, the IP packet header is formed with 20 bytes. Since no option is used under a general condition, the transmission is made with data inclusive of a 20-byte field stored in the private data region as it is.

The payload of the TS subsequent to the adaptation field is stored with data in a PES (Packet Elementary Stream) format. The reason why the video signal is transmitted in the PES format will be described later on.

Figure 2:
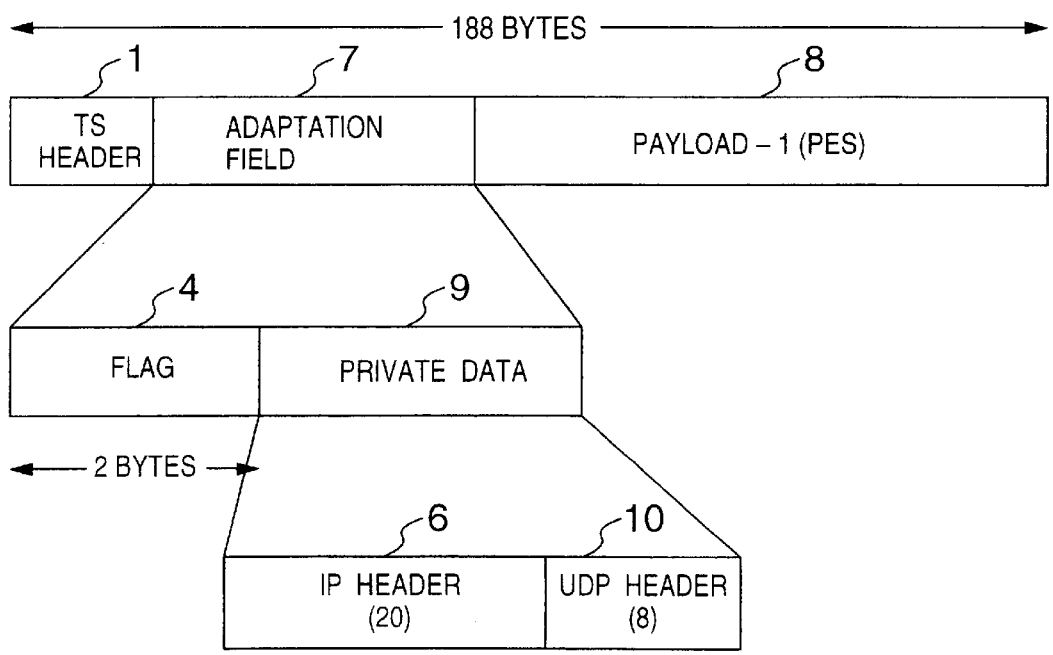
FIG. 2 is a diagram showing an embodiment of a system in which the transmission is made with an IP header and a UDP header encapsulated into an MPEG-TS packet.
Figure 3:
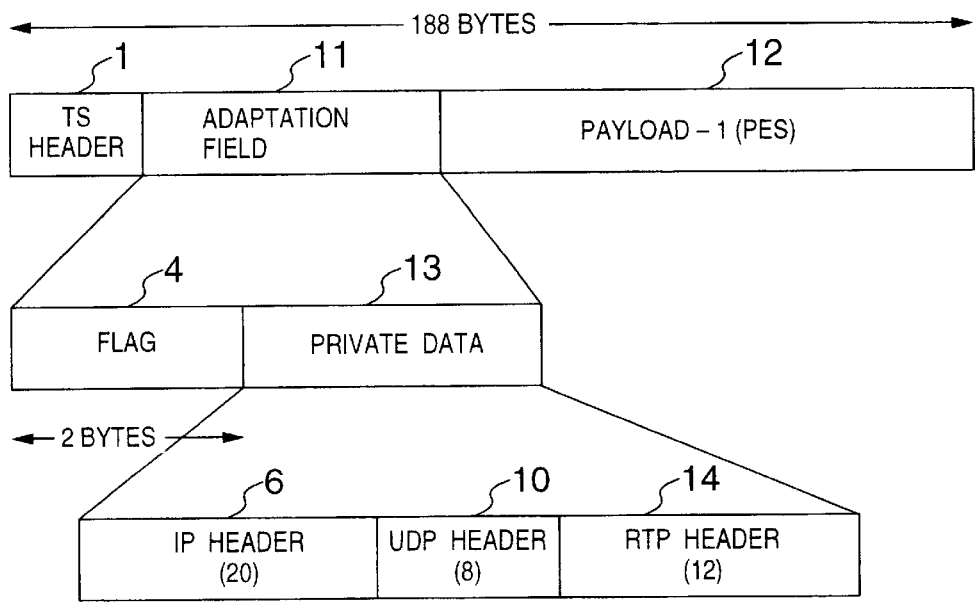
FIG. 3 is a diagram showing an embodiment of a system in which the transmission is made with an IP header, a UDP header and an RTP header encapsulated into an MPEG-TS packet.

Though the embodiment of FIG. 1 shows an example of transmission with only the IP packet header included as the private data, there may be employed a format in which a UDP (User Datagram Protocol) header or both the UDP header and an RTP (Real Time Protocol) header is included in accordance with a protocol which a terminal (or client) connected to the IP network supports. FIG. 2 corresponds to an embodiment in the case where a UDP header 10 is stored subsequently to an IP header 6 as private data 9, and FIG. 3 corresponds to an embodiment in the case where the transmission is made with an IP header 6, an UDP header 10 and an RTP header 14 included as private data 13. The present invention is characterized in that data of a packet header of a protocol used in an IP network is transmitted as private data. Accordingly, the present invention is not limited to a specified protocol such as UDP or RTP. Under the existing circumstances, since the use of RTP is most effective for the transmission of a real-time video signal, the packet construction shown in FIG. 3 is the best. The embodiments shown in FIGS. 1, 2 and 3 have been described in conjunction with the case where the IP header, the UDP header or the RTP header is transmitted as the private data, as it is. However, it is of course that, for example, data necessary for constructing an IP header can be transmitted as private data with a changed form. In such a case, there is required a processing for reconstructing the IP header or the like by an interworking unit on the basis of data transmitted thereto. Therefore, it can easily be understood that the most effective way is the transmission of the header with a form thereof kept as it is.

Now, the reason of use of PES as the data format will be described in brief. As shown in FIG. 8, the video server 55 also transmits the video signal to the STB 57 connected to the CATV network. In the aspect of reduction in data generation cost and system cost, it is preferable that video to be transmitted to the internet 50 and video to be transmitted to the STB 57 are used in common. The use of the PES system employed in the conventional CATV is most suitable. Since information of the IP header encapsulated into the adaptation field is processed separately from video and audio signals, no influence is given on video reproduction by the conventional STB 57. The use of the PES format makes it possible to transmit the video signal to the IP network while maintaining the signal compatibility with the conventional STB. Though the PES format is not prescribed by RFC 2038, PES is constructed by dividing ES into a plurality of packets and thereafter applying a PES header to each packet. Therefore, PES can easily be converted into ES. Accordingly, a client capable of receiving and decoding ES can perform the decoding with little addition of a function.

Figure 6:
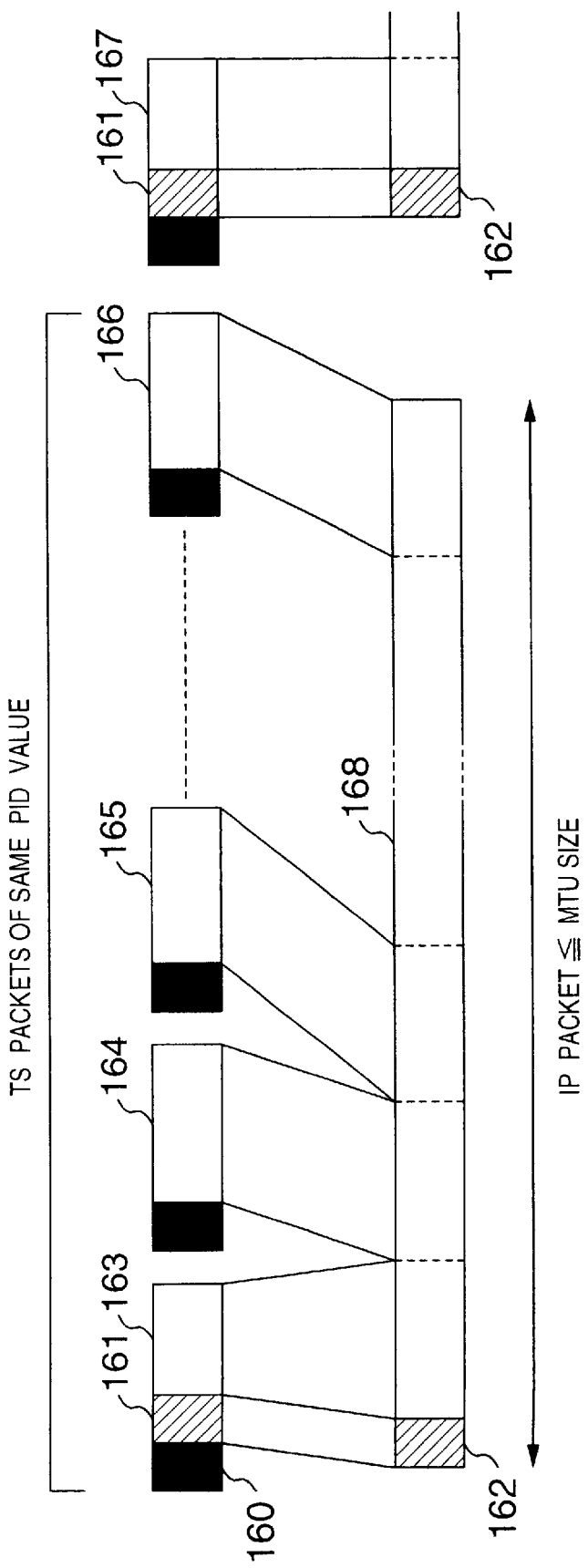
FIG. 6 is a diagram showing an embodiment of a method of forming an IP packet from TS packets.

The supplementary description will now be made of the IP packet forming method. In the Internet, the maximum transfer unit (MTU) size of an IP packet is 1500 bytes when Ethernet is used. Accordingly, the number of 184-byte payloads of MPEG-TS capable of being packed is seven at the greatest. Thus, in transmitting TS packets, they are transmitted with an IP header included at the period of 7 TS. As conceptually shown in FIG. 6, the interworking unit receiving packets including IP headers forms an IP header and thereafter connects data of payloads in subsequently transmitted TS packets to the IP header, thereby forming an IP packet. The MTU size in the Internet is 1500 bytes but there may be the case where the MTU size in the other physical network is different than that. In such a case, it is of course that the IP header transmission period can be changed in accordance with the MTU size. A condition in the present invention is that the total bytes of TS packet payloads in an interval from a TS packet inclusive of an IP header to a TS packet inclusive of the next IP header does not exceed the number of bytes defined by the MTU.

Figure 12:
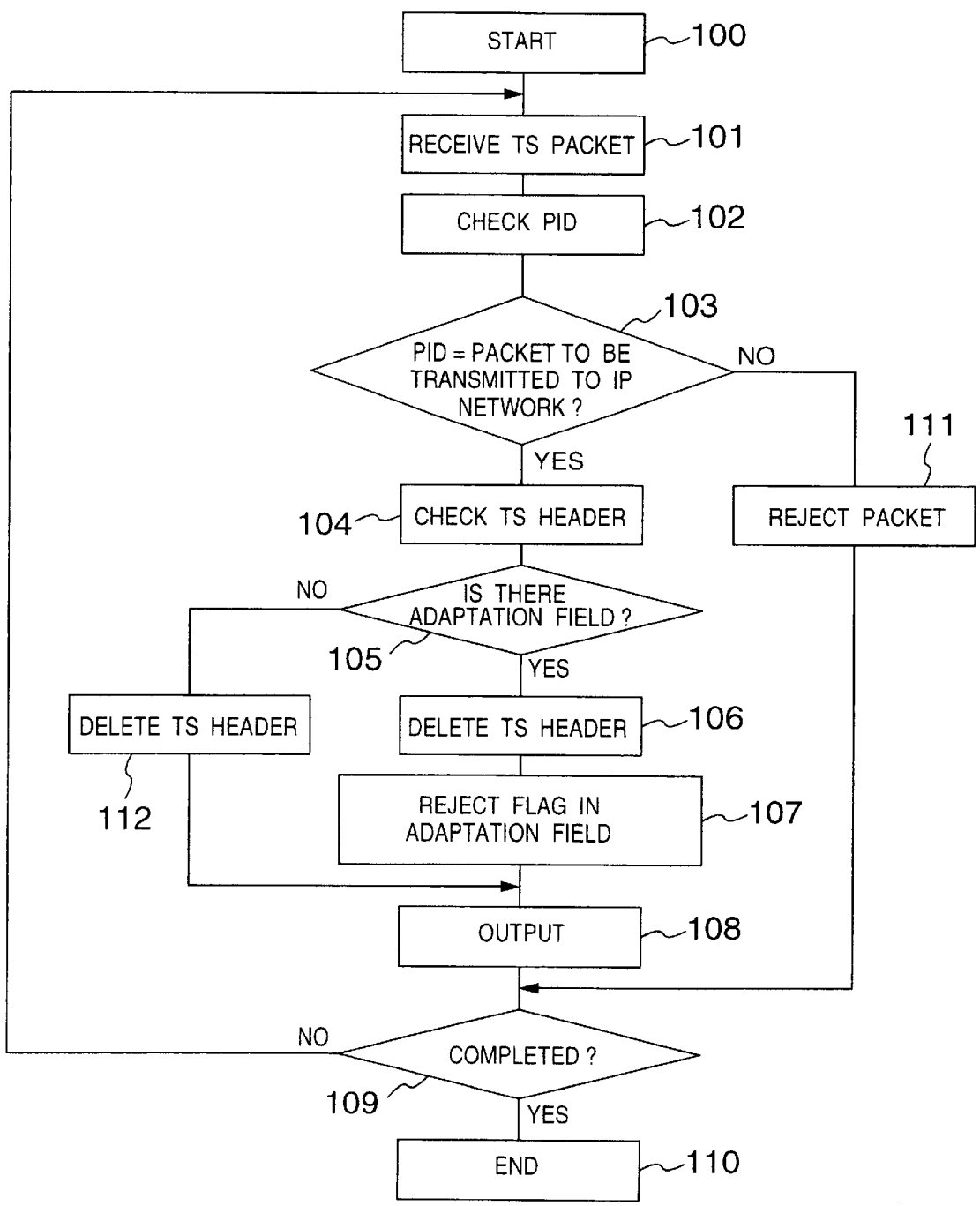
FIG. 12 is a flow chart for explaining a signal processing by an interworking unit.
Figure 13:
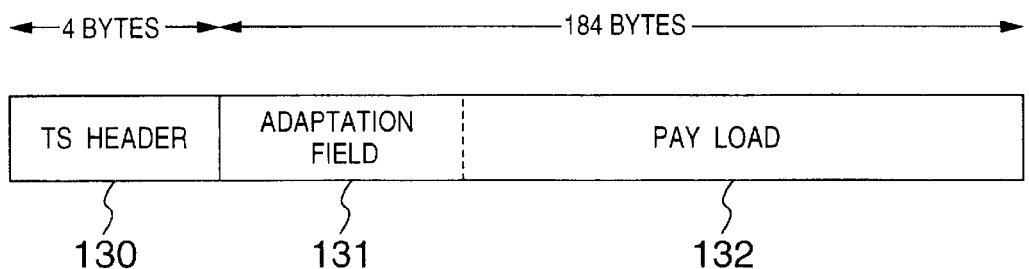
FIG. 13 is a diagram for explaining the structure of MPEG-TS.
Figure 14:
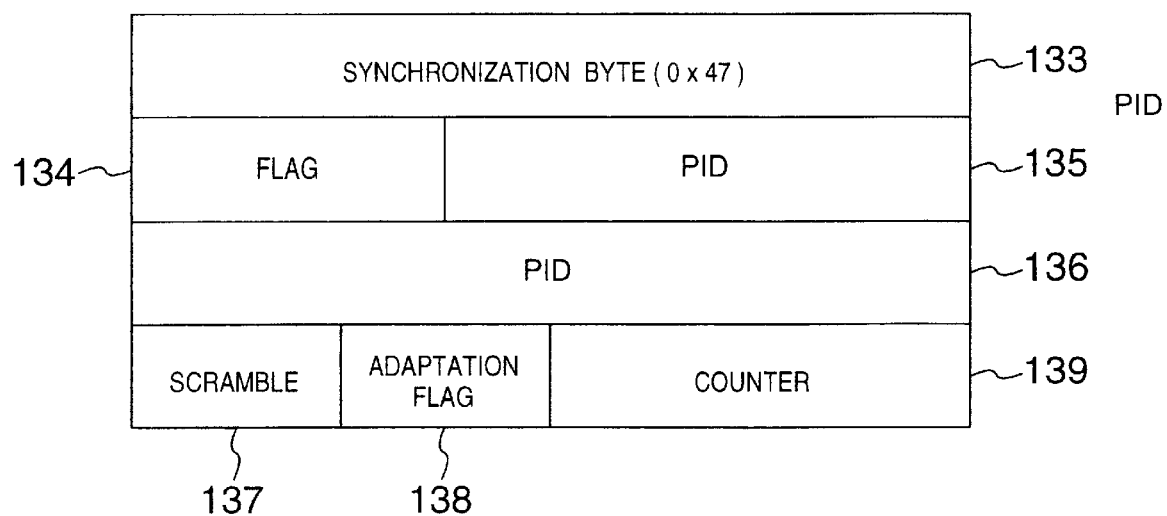
FIG. 14 is a diagram for explaining the structure of a header of MPEG-TS.

Next, description will be made of a system in which an MPEG-TS packet is formed with such a construction as shown in FIG. 1, 2 or 3 and the packet is processed by an interworking unit and then transmitted to an IP network. FIG. 12 illustrates an embodiment showing the flow of processings in the interworking unit. It is assumed that the video server on the CATV network transmits an MPEG-TS signal (see FIGS. 13 and 14) in accordance with an encapsulation system as shown in FIG. 2. As shown by a procedure of FIG. 12, the interworking unit receives the transmitted MPEG-TS signal (or packet) (step 100) to extract therefrom a signal to be transmitted to the IP network. The selection of the MPEG-TS packet to be transmitted is made by checking a PID 135 in a TS packet header (steps 102 and 103). In the case where the packet is not one to be transmitted to the IP network, that packet is rejected (step 111). In the case where the packet is one to be transmitted to the IP network, a flag 138 indicative of the presence/absence of an adaptation field in a TS header of that packet is checked (steps 104 and 105). In the case where the check of the flag 138 results in that there is an adaptation field, the TS header of that packet is deleted (step 106) and flag information of the adaptation field is thereafter deleted (step 107). As a result, a private data portion of the adaptation field and the subsequent payload portion are outputted (step 108). In the case where the check of the flag 138 indicative of an adaptation field in the TS header of the TS packet (steps 104 and 105) results in that there is not an adaptation field, only the TS header of that TS packet is deleted (step 112) and private data is outputted (step 108). As the result of the above processing, the interworking unit deletes the TS header and transmits an IP packet header stored as the private data and subsequently image data as the payload. With the encapsulation in the present embodiment as mentioned above, the generation of an IP packet from MPEG-TS is possible by only an extremely simple processing which includes the check of two flags (the check of PID and the check of presence/absence of adaptation) and the rejection of unnecessary data portion. As a result, there is obtained a great effect that the interworking unit can be constructed by a processor which has a poor processing ability or a low cost.

Figure 11:
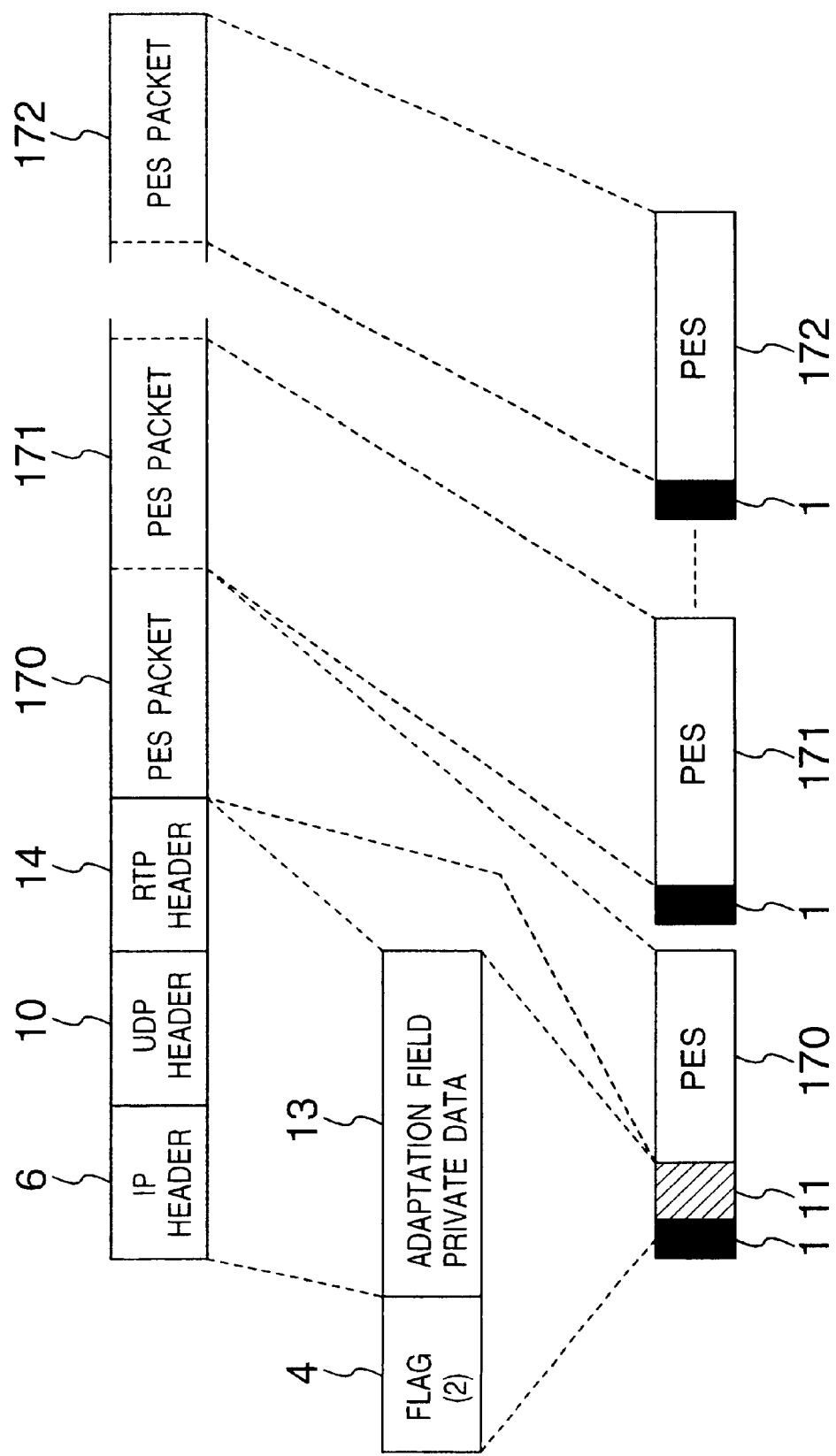
FIG. 11 is a diagram showing an embodiment in which a packet IP-packetized by an interworking unit is MPEG-TS packetized again.

Next, a processing for converting an IP-packetized video signal into an MPEG-TS signal again will be described using FIG. 11. The interworking unit 54 shown in FIG. 8 or 9 is inputted with an IP packet including an IP header, an UDP header, an RTP header and PES data. Private data as the collection of a 2-byte adaptation related flag and IP related headers (IP, UDP and RTP headers) is stored as an adaptation field into TS. The remaining or payload of this TS is filled with PES data, thereby ultimately forming a 188-byte TS packet. The remaining payload of the IP packet is partitioned every 184 bytes so that each part is accommodated into a TS payload. There is no possibility that the IP header is used in the CATV network. However, if the IP header is rejected or deleted and only the payload portion is stored into the TS payload, there is yielded a TS which is short in the number of data bytes. In this case, a processing such as the padding of data corresponding to the shortage is necessitated. The procedure including such complexity is not preferable. Accordingly, the restoration to the same packet construction as that in the transmitting CATV network is preferable. Since there is no practical problem if the matching in the number of bytes is attained, it is also possible to insert dummy data the number of bytes of which is the same as that of the IP header. Since private data in the adaptation field can be ignored by the STB, as mentioned before, it may be invalid data.

(Third Embodiment)

Figure 4:
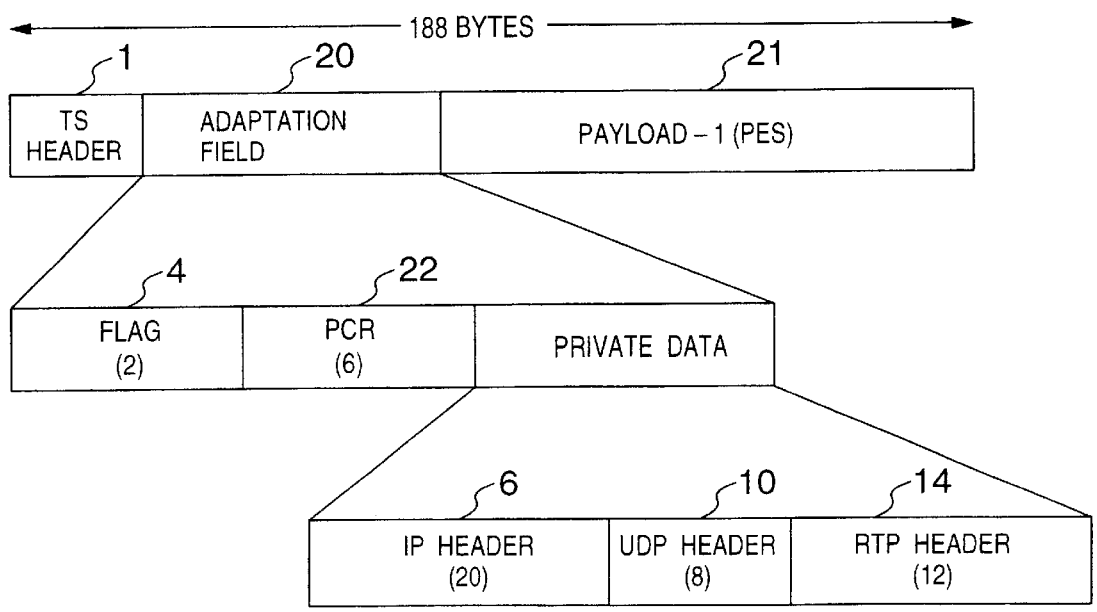
FIG. 4 is a diagram showing an embodiment of a method for encapsulation with PCR included in an adaptation field.
Figure 5:
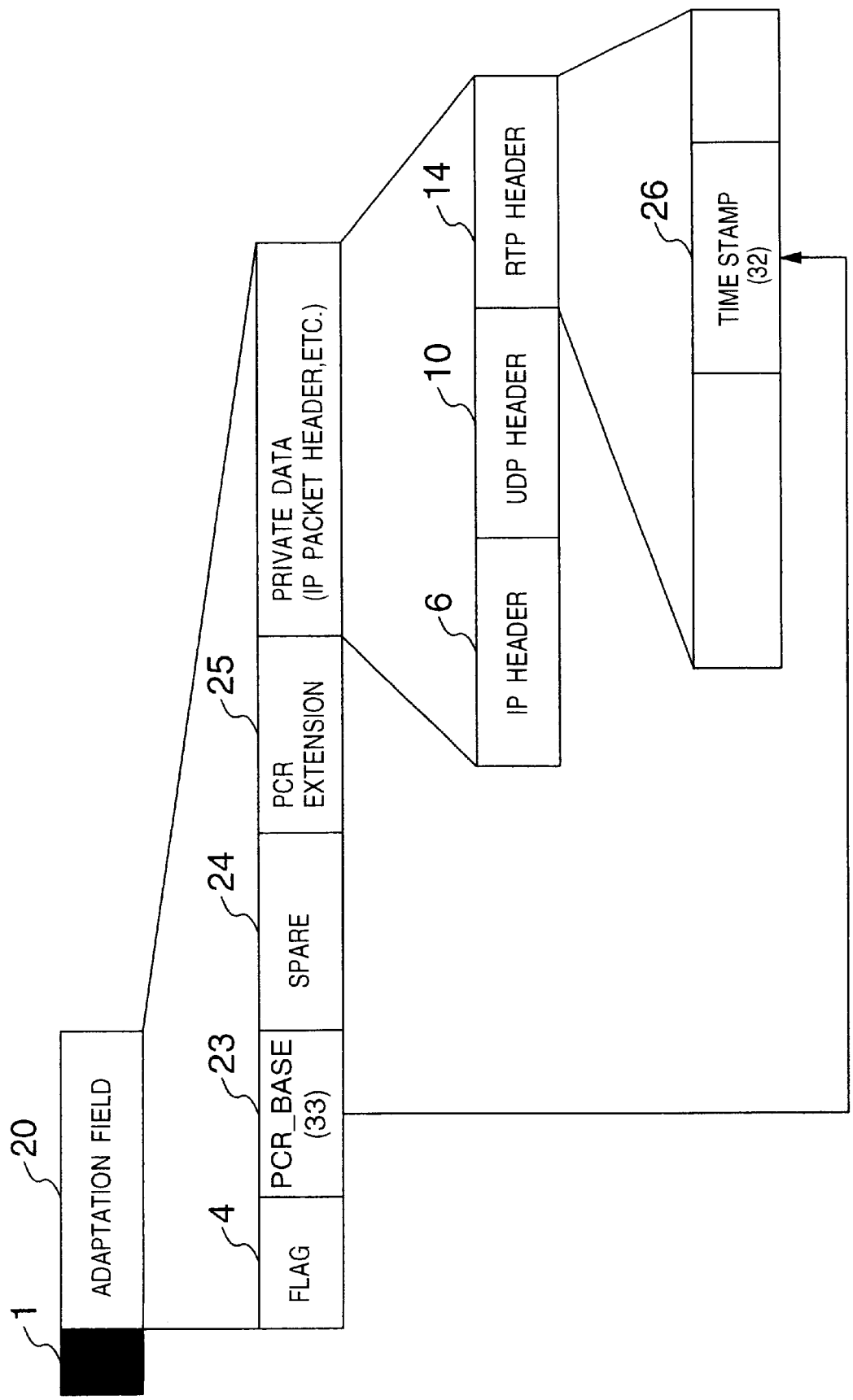
FIG. 5 is a diagram for explaining an embodiment in which the PCR transmitted in conjunction with FIG. 4 is stored in a time stamp field of RTP.

FIG. 4 is a diagram showing a third embodiment of the present invention. The construction of a network to which the present embodiment is applied is the network construction shown in FIG. 8 or 9. The embodiment shown in FIG. 4 is different from the embodiment of FIG. 1, 2 or 3 in that the transmission is made with a program clock reference (PCR) too included in an adaptation field and that an RTP header is included in an IP packet to be transmitted as private data. In the RTP protocol, a field for recording time information or time stamp is provided in a RTP packet header in order to ensure the transmission of data such as a video signal necessitating the real time transmission. In a terminal or client receiving MPEG-TS, PCR is utilized for reproducing system clocks of a TS decoding circuit. And, the time stamp of RTP is caused from the digitization of a time at a fundamental frequency of 90 kHz in the same manner as PCR. Therefore, it is possible to use PCR as the time stamp of RTP. The embodiment shown in FIG. 4 is characterized in that PCR transmitted by means of a PCR field 22 of the adaptation field is used in a time stamp field 26 of RTP, as shown in FIG. 5. The time stamp of RTP and a base portion of RTP represent time information by the bit widths of 32 bits and 33 bits, respectively. Therefore, it is possible to attain the bit width matching by using lower 32 bits of PCR. One merit when time information transmitted as PCR is thus utilized as the time stamp of RTP lies in that the inclusion of ultimately corrected accurate time information into the RTP header is possible even in the case where PCR is relocated for the purpose of correcting packet transmission jitter generated in a CATV network.

(Fourth Embodiment)

Figure 10:
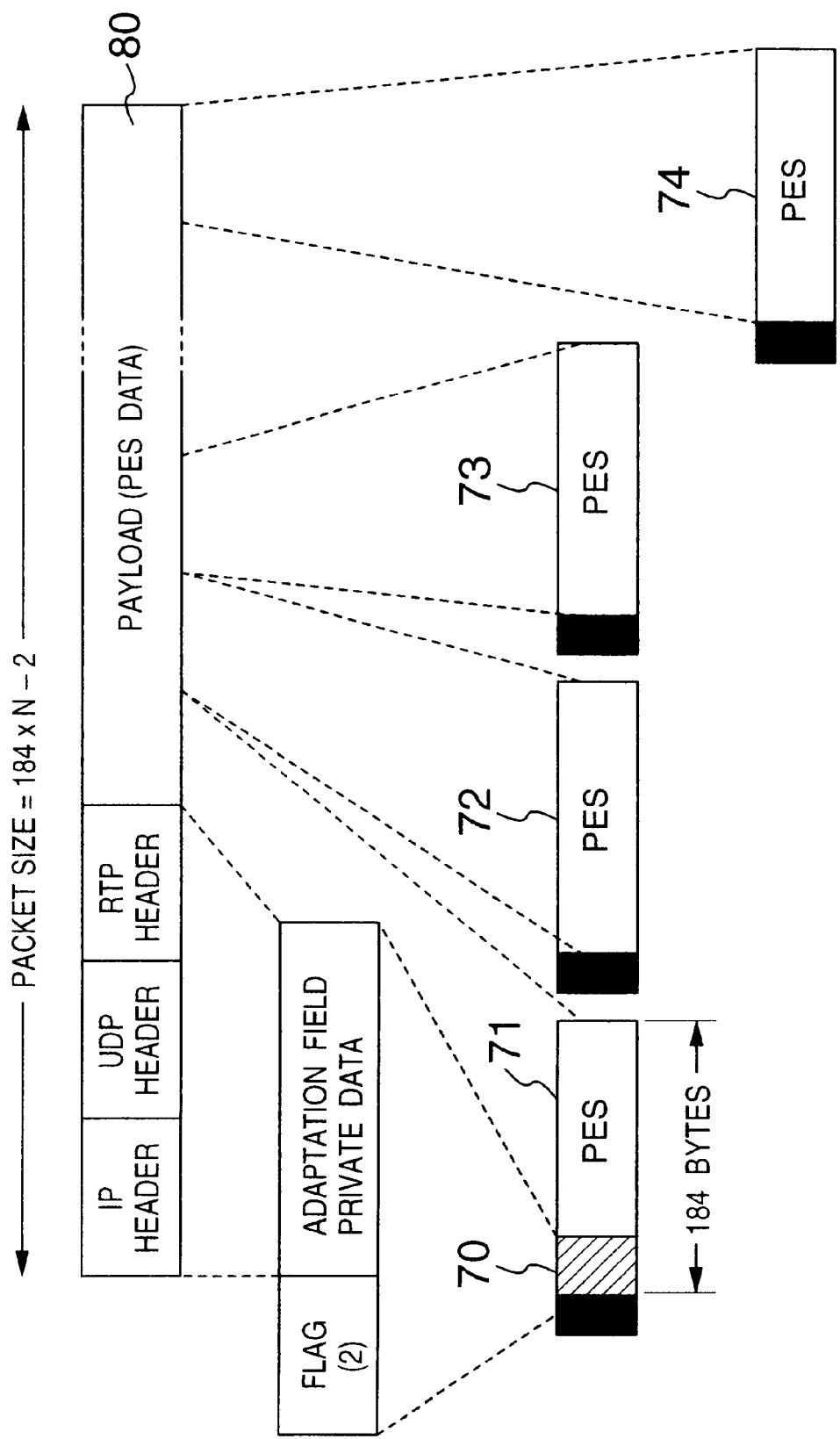
FIG. 10 is a diagram showing an embodiment in which a signal transmitted from a server on an IP network by use of an IP packet is MPEG-TS packetized.

FIG. 10 shows an embodiment illustrating the encapsulation of data when video transmission is made toward the CATV network 56 (see FIG. 8) from the server 52 connected to the IP network. In the case of transmission and reception of this image, the interworking unit 62 needs an operation of converting an MPEG video signal (PES) transmitted by use of an IP packet into an MPEG-TS signal. This converting operation will be described referring to FIG. 10. In the case where a video is transmitted by use of an IP packet, video data is encapsulated on the basis of a PES format in order to facilitate the conversion into TS. Accordingly, this IP packet is constructed with an IP header and a payload in a PES format. In the converting operation, the IP packet is transmitted from the server on the IP network with the IP packet constructed to have a packet size such that the addition of 2 to the packet size (or the size of data including an IP header and a payload) is integer times as large as 184. In converting the IP packet into MPEG-TS, a leading portion including the IP packet header is extracted by 182 bytes and is added with a 2-byte flag of an adaptation field so that the resultant is stored as a 184-byte payload of MPEG-TS. Further, an MPEG-TS header is applied to this payload, thereby forming an MPEG-TS packet. The succeeding IP packet is partitioned every 184 bytes and the TS packet header is applied to each part for the conversion into MPEG-TS. Since there is the condition that the size of the IP packet is integer times as large as 184 bytes plus 182 bytes, it becomes possible to store the IP packet into the payloads of MPEG-TS packets with no residual byte. As apparent from the foregoing description, the feature of the present embodiment lies in that by imposing a restriction on the size of an IP packet transmitted from a server on an IP network which transmits an MPEG image, the division and reconstruction of the packet in an interworking unit are very simplified.

In one modification of the present embodiment or in the case where an RTP protocol is utilized so that time stamp of RTP is inserted as PCR, the total length of an IP packet may be integer times as large as 184 bytes plus 176 bytes.

(Fifth Embodiment)

Figure 15:
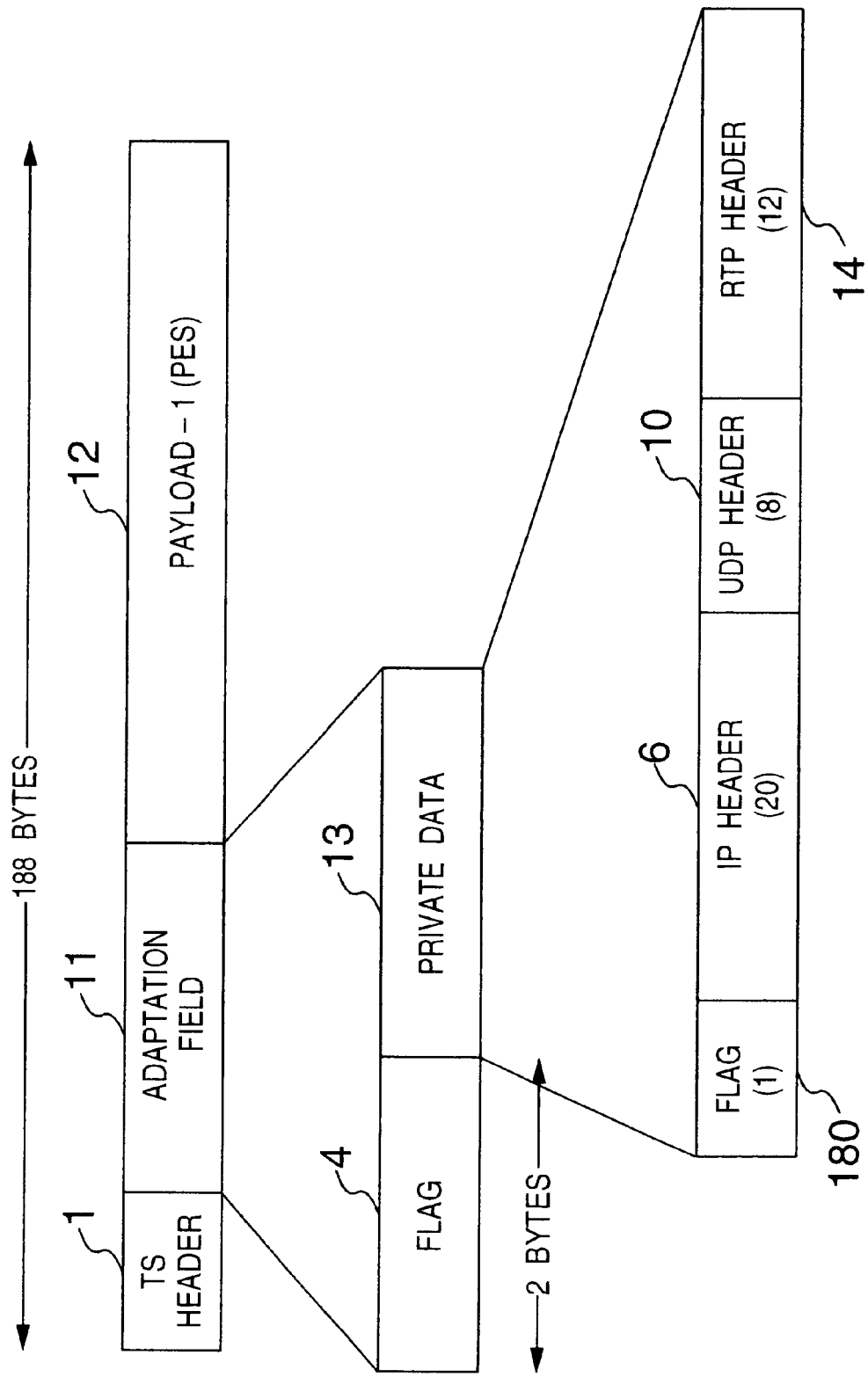
FIG. 15 is a diagram for explaining an embodiment in which a flag indicative of an IP packet is provided in private data.

A fifth embodiment of the present invention corresponds to a modification of the second embodiment. In the encapsulation of the IP packet of FIG. 1 used in conjunction with the second embodiment, the IP header is directly mapped as the private data of MPEG-TS. In the present embodiment, a region 150 indicating the attribute of private data is provided in a leading byte of the private data, as shown in FIG. 15. With the provision of a flag in this attribute region, it is expressly indicated that contents transmitted as the private data are the IP header. The interworking unit uses this flag to make the judgement as being an IP packet or not or the judgement of utilization/rejection. Since the data in the attribute region is unnecessary in the IP network, there is a need to reject it in performing protocol conversion by the interworking unit.

Though FIG. 15 shows an example in which the 1-byte attribute region is provided, it does not necessarily follow that the size of the attribute region is one byte. it can easily be understood that the size of the attribute region may be a plurality of bytes.

According to the first to fifth embodiments described above, it becomes possible to interconnect CATV networks by use of the Internet as a worldwidely connected network. Thereby, the effect of the reduction of an operation cost by the cooperative utilization of video contents is obtained. Also, since a processing required for protocol conversion necessary for the connection of the Internet and the CATV network can greatly be reduced, there is a great effect that an interworking unit can be constructed even with a low-cost processor.

In the following, embodiments of a method for conversion between the IP address of an IP packet and the PID value of an MPEG-TS packet and an equipment therefor (hereinafter referred to as IP/PID conversion equipment) according to the present invention will be described in detail. In the following embodiments, the description is made using a DAVIC network as a network which uses MPEG-TS packets. The CATV system portion shown in conjunction with the first to fifth embodiments corresponds to the DAVIC network in the following embodiments.

(Sixth Embodiment)

Figure 26:
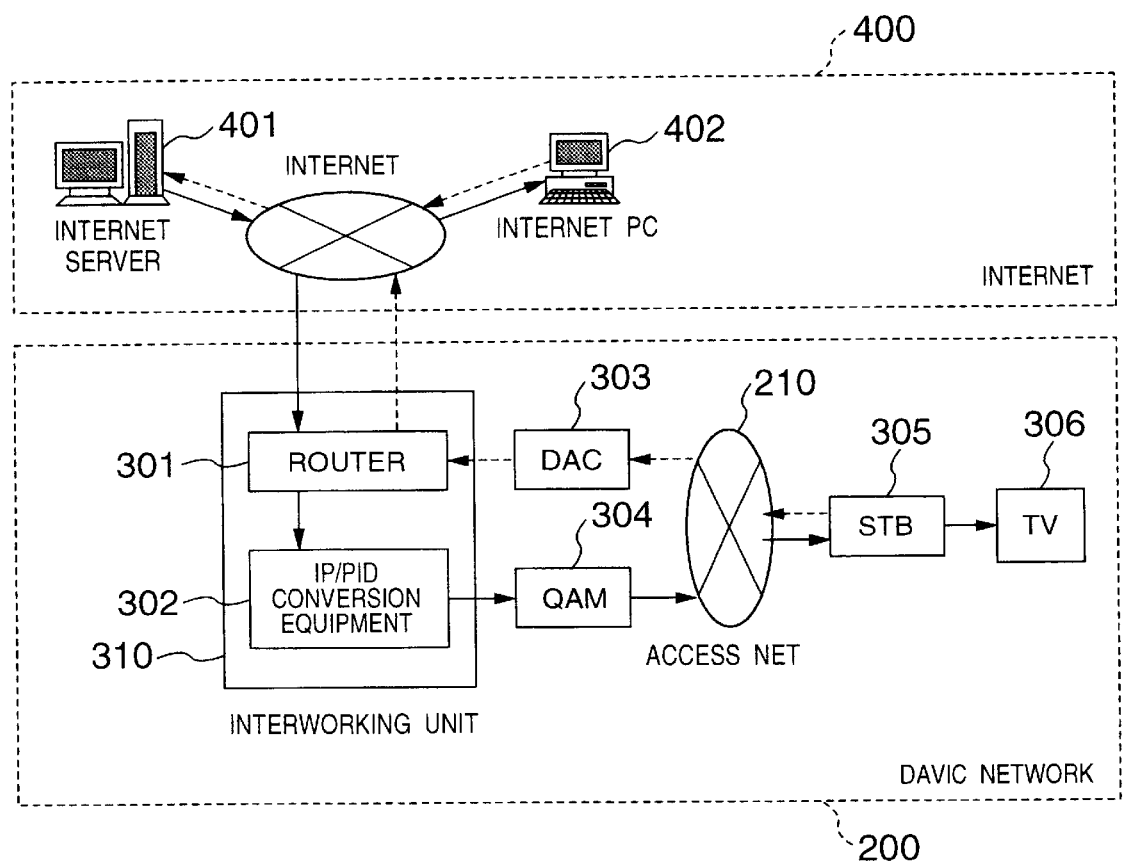
FIG. 26 is a diagram showing an example of a network construction in which an IP/PID conversion equipment according to the present invention is used.

First, an example of a network construction in which an IP/PID conversion equipment according to the present invention is used will be described using FIG. 26 which shows a diagram of the network construction. Reference numeral 400 denotes the Internet network, and numeral 200 denotes a DAVIC network. In the Internet network 400, a client or personal computer (PC) 402 can make a request for video transmission to a video server 401, thereby receiving desired video data in an IP packet format and reproducing it. In FIG. 26, it is also possible for an STB (Set Top Box) 305 connected to the DAVIC network to make access to the video server 401 on the Internet, thereby receiving and reproducing desired video data. In the DAVIC network 200, reference numeral 310 denotes an interworking unit for interconnecting the Internet and the DAVIC network, numeral 301 a router, numeral 302 an IP/PID equipment according to the present invention, numeral 303 a DAC (Dial-up Access Concentrator), numeral 304 a QAM (Quadrature Amplitude Modulation), numeral 201 an access network, numeral 305 the STB, and numeral 306 a TV. Description will now be made of an operation of making access to the video server 401 on the Internet from the STB connected to the DAVIC network to receive and reproduce video data. First, a user starts access to the server on the Internet through a modem incorporated in the STB 305. The DAC 303 concentrates accesses from a plurality of users and establishes a line for the video server on the Internet through the router 301 in the interworking unit 310. Thereafter, the user refers to a video guide or electronic program guide (EPG) displayed on the TV 306 to select a desired program. When the desired program is selected, the video server 401 on the Internet encapsulates the requested video data into IP packets and transmits the IP-packetized data to the requesting STB. The video data in the IP packet format transmitted from the video server 401 is transferred through the router 301 to the IP/PID conversion equipment 302 according to the present invention. The IP/PID conversion equipment 302 generates PID from the IP address of the received IP packet to convert the received video data in the IP packet format into video data in a TS packet format applied with the generated PID and transmits the TS-packetized video data to the QAM 304. The QAM 304 subjects the received video data in the TS packet format to QAM modulation and transmits the modulated data to the access network 210. The STB 305 receives the desired video data by selecting, from the signal received from the access network 210, a frequency at which the desired data is modulated and a TS packet with which the desired data is transmitted. Also, the STB 305 decodes the received video data and transmits the video image to the TV 306 which in turn reproduces and displays the video image.

Figure 16:
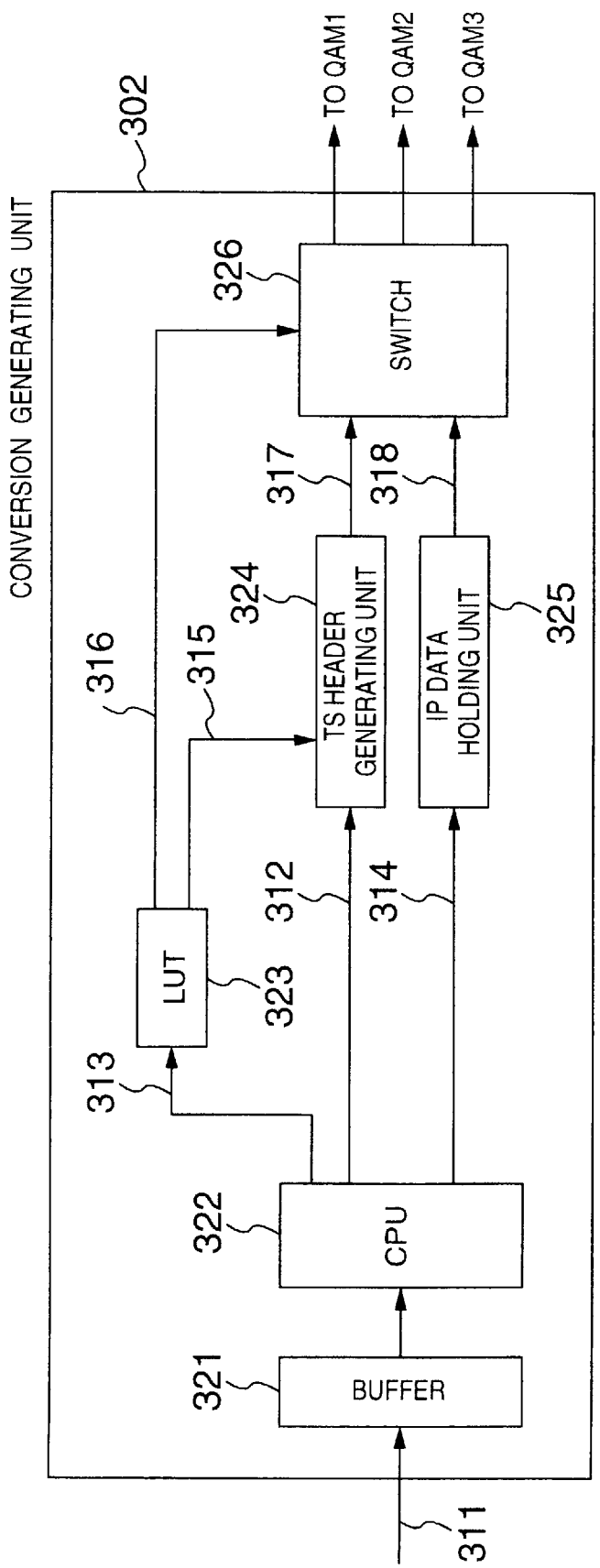
FIG. 16 is a block diagram showing the construction of an embodiment of an IP/PID conversion equipment according to the present invention.
Figure 17:
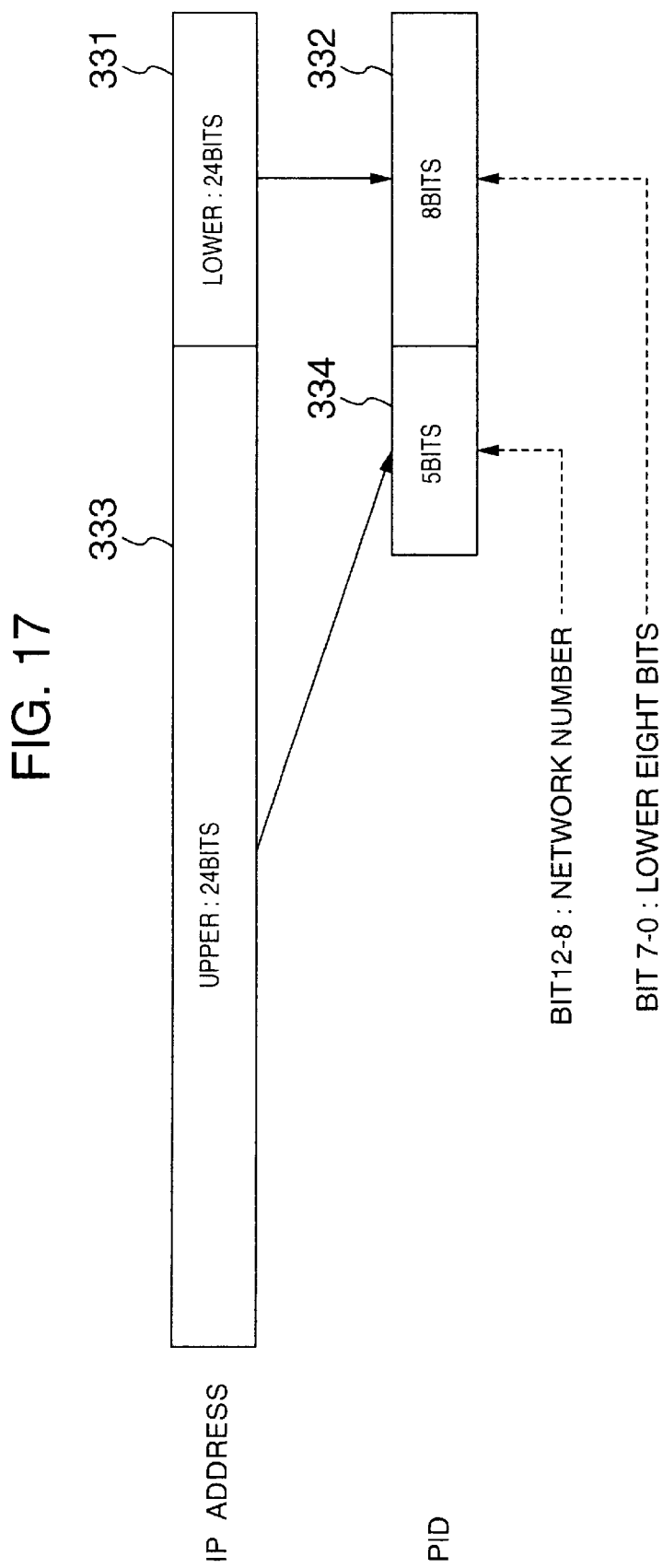
FIG. 17 is a diagram showing the correspondence between an IP address and a PID value in the embodiment shown in FIG. 16.

Next, the description of the IP/PID conversion equipment according to a sixth embodiment of the present invention will be made using FIGS. 16 to 18. FIG. 16 is a block diagram showing the construction of the IP/PID conversion equipment according to the sixth embodiment, FIG. 17 is a diagram showing the correspondence for conversion between an IP address and a PID value, and FIG. 18 shows the contents of data in an LUT (Look-Up Table) shown in FIG. 16. In the IP/PID conversion equipment shown in FIG. 16 according to the sixth embodiment, lower 8 bits (Bit: 7-0) of an IP address and lower 8 bits (Bit: 7-0) of a PID value are made the same and upper 24 bits (Bit: 31-8) of the IP address are degenerated into 5 bits so that the degenerated 5 bits are converted into upper 5 bits (Bit: 12-8) of the PID value.

The IP/PID conversion equipment shown in FIG. 16 according to the sixth embodiment of the present invention includes a buffer 321 for receiving an IP packet, a CPU 322, an LUT 323 for holding data indicative of the conversion between an IP address and a PID value (or an IP address to PID value conversion table), a TS header generating unit 324 for generating a TS header, an IP data holding unit 325 for holding data of the IP packet, and a switch 326 for transmitting video data in a TS packet format to a predetermined QAM. Subsequently, description will be made of the operation of the IP/PID conversion equipment according to the sixth embodiment of the present invention which has the above construction.

The IP/PID conversion equipment shown in FIG. 16 first receives video data 311 in a IP packet format by the buffer 321. The CPU 322 reads the IP packet from the buffer 321 to transmit data 312 of lower 8 bits (Bit: 7-0) of an IP address to the TS header generating unit 324 and data 313 of upper 24 bits (Bit: 31-8) thereof to the LUT 323. The CPU 322 also transmits IP packet data 314 to the IP data holding unit 325. By the LUT 323, data 315 resulting from the degeneracy of the data 313 of upper 24 bits (Bit: 31-8) of the IP address from the CPU 322 into 5 bits is transmitted to the TS header generating unit 324 and QAM number for multiplexing QAM data 316 is transmitted to the switch 326. The TS header generating unit 324 generates the PID value of a TS packet on the basis of the data 312 of lower 8 bits (Bit: 7-0) of the IP address from the CPU 322 and the data 315 from the LUT 323 resulting from the degeneracy of the data 313 of upper 24 bits (Bit: 31-8) of the IP address from the CPU 322 into 5 bits and generates a header of the TS packet. A procedure for generating the PID value of the TS packet from the the IP address of the received IP packet will be mentioned later on by use of FIGS. 17 and 18. The switch 326 reads TS header data 317 from the TS header generating unit 324 and IP data 318 from the IP data holding unit 325 which turns into data of the TS packet. The TS header data 317 and the IP data 318 as the TS packet data are transmitted to a predetermined QAM number for multiplexing QAM (any one of QAM1 to QAM3) in accordance with the QAM number for multiplexing QAM data 316 from the LUT 323. Though the above description has been made in conjunction with the example in which data converted from an IP packet into a TS packet is QAM-modulated in the IP/PID conversion equipment for retransmission to the post stage, a transmission system such as QPSK (Quadrature Phase Shift Keying) other than QAM may be used.

FIG. 17 is a diagram showing the correspondence between the IP address of a received IP packet and the PID value of a TS packet to be transmitted. In FIG. 17, the value 331 of lower 8 bits (Bit: 7-0) of the IP address is converted into the value 332 of lower 8 bits (Bit: 7-0) of the PID value. The value 333 of upper 24 bits (Bit: 31-8) of the IP address is degenerated into a 5-bit value as a network number value for conversion into the value 334 of upper 5 bits (Bit: 12-8) of the PID value. The term of "degenerated" or "degeneracy" used herein means the conversion of a 24-bit value into a 5-bit value. This degeneracy or conversion will specifically be described using FIG. 18.

FIG. 18 is a diagram showing that correspondence between the upper 24-bit (Bit: 31-8) value 333 of an IP address, a 5-bit value as a network number value, and a QAM number for output value which is held in the LUT 323 shown in FIG. 16. In FIG. 18, it is shown that, for example, the IP address of 128.155.30.XXX series (XXX indicating any value of 0 to 255) is converted into a network number 1 (00001 in a binary number). Similarly, it is shown that the IP address of 128.155.40.XXX series is converted into a network number 2 (00010) and the IP address of 128.155.80.XXX series is converted into a network number 30 (11110). By holding such a conversion table by the LUT 323, it becomes possible to convert the upper 24-bit (Bit 31-8) value 333 of the IP address into the 5-bit value 334. As for PID values, however, since there are values (hexadecimal number: 0x0000 to 0x000F and 0x1FFF) which "GENERIC CODING OF MOVING PICTURES AND ASSOCIATED AUDIO: SYSTEMS" (ITU-T H.222.0, ISO/IEC 13818-1) prescribes for use, values of 0x0010 to 0x1FFE can be used. In the case where 0 (binary number: 00000) or 31 (binary number: 11111) is used as the network number in FIG. 18, the PID value may overlap the prescribed value in accordance with the lower 8-bit value. For example, in the case where the network number is 0 (binary number: 00000) and the lower 8-bit value is 1 (binary number: 00000001), the PID value comes to 1 (hexadecimal number: 0x0001) which overlaps the value prescribed by H.222.0 for use. This problem or such overlapping can be avoided by establishing a prohibition rule for avoiding the case where there overlaps the value prescribed by H.222.0 or by using 1 to 30 as the network number. In the example shown in FIG. 18, the description has been made in conjunction with the conversion of the upper 24-bit (Bit: 31-8) value 333 of the IP address into the 5-bit value. However, in the case where the series of IP addresses providing services are such that the upper 16 -bit (Bit: 31-16) value of the IP address is of the same series, for example, as in the case of 128.155.XXX.XXX in FIG. 18, it is also possible to omit the upper 16 bits (Bit: 31-16) with the conversion table formed by use of only the remaining 8 bits (Bit: 15-8).

FIG. 18 further shows the correspondence between the upper 24-bit (Bit: 31-8) value 333 of an IP address and a QAM number for TS packet output. This correspondence represents a relationship between the IP address upper 24-bit (Bit: 31-8) value 333 inputted to the LUT 323 shown in FIG. 16 and the data 316 outputted therefrom as the value of a QAM number for output of transmission data (or TS packet). The example shown in FIG. 18 indicates that in the case where users of 128.150.30.XXX and 128.150.40.XXX series make access to the server on the Internet, requested data is transmitted to the users through the QAM (or frequency) of a QAM number (QAM No.) 1. It is also indicated that in the case where a user belonging to a 128.150.80.XXX series makes access, requested data is transmitted to the users through the QAM (or frequency) of a QAM number 3. With such a construction in which a QMA number for transmission is designated for the IP address series of a data requesting user, the number of users holding in common the amount of data capable of being transmitted by one QAM can be set for each IP address series. In the case where 1 to 30 are used as network numbers when data is transmitted by one QAM, 30 ones of series designated by upper 24 bits (Bit: 31-8) of each IP address can be used. In the case where 31 or more series are to be transmitted, an overlapping value exists as a network number so that a one-to-one correspondence becomes unobtainable between the IP address and the PID value. As a result, even if the conversion from the IP address into the PID value is possible, it is impossible to determine the IP address uniquely from the PID value. However, if a QAM number (or frequency) for transmission of data is different, the overlapping of a network number provides no problem.

As described in the foregoing, a PID value (13 bits) is formed from an IP address (32 bits) and this conversion is performed in the LUT 323 and the TS header generating unit 324 which are shown in FIG. 16. Also, a QAM (or frequency) number for transmission of data (or TS packet) is designated in the LUT 323 from the series of the IP address. As mentioned above, requested data (or IP packet) is converted by the interworking unit into a TS packet and is then QAM-transmitted. However, if the receiving side does not know the PID value of TS and a QAM number with which desired data is transmitted, the receiving side cannot make the selective reception of data. A method for receiving desired data will now be described using FIGS. 19 and 20.

FIG. 19 is a diagram showing the case where each of a data transmitting interworking unit 310 and a data receiving STB 305 holds data indicative of the correspondence for conversion between an IP address and a PID value (or an IP address to PID value conversion table). In substance, reference numerals used in FIG. 19 are the same those used in FIGS. 16 and 26. An LUT 323 in FIG. 19 is the same as the LUT 323 in FIG. 16, that is, a look-up table having data indicative of the correspondence for conversion between an IP address and a PID value and a frequency (or QAM number) for transmission of data. In FIG. 19, the transmitting interworking unit 310 converts an IP packet received through a router 301 into a TS packet in accordance with the LUT 323 possessed by the interworking unit 310 and transmits the TS packet to the QAM 304. The QAM 304 modulates the TS packet and transmits the modulated TS packet to an access network 210. The STB 305 refers to the LUT 323 on the basis of its own IP address to select, from the received signals having a plurality of frequencies, a signal having a frequency at which desired data is transmitted and to select a TS packet having a PID value designated by the LUT 323, thereby receiving the desired data. In the case where the received data is to be reproduced by a TV 306 connected to the STB 305, the received data may be decoded so that it is reproduced by the TV 306. Also, in the case where the received data is to be further transmitted to a personal computer (PC) 307 or the like connected to the STB 305, each of the STB 305 and the PC 307 holds an LUT similar to the above-mentioned LUT 323. Thereby, it is possible to further transmit the received TS packet to the PC 307.

FIG. 20 shows a modified example of the case shown in FIG. 19. In this example, data indicative of the correspondence for conversion between an IP address and a PID value and data indicative of the correspondence between the IP address and a frequency (or QAM number) for transmission of data are transmitted from the interworking unit 310 to the STB 305. In FIG. 19, the correspondence for conversion between an IP address and a PID value and the correspondence between the IP address and a frequency (or QAM number) for transmission of data are held by both the interworking unit 310 and the STB 305. In FIG. 20, however, they are held by the interworking unit 310 from which only data indicative of the correspondence for conversion between an IP address and a PID value and the correspondence between the IP address and a TS packet transmission frequency (or QAM number) as required by the STB 305 is transmitted to the STB 305. In FIG. 20, when the interworking unit 310 receives an IP packet 311 having a novel IP address and performs the conversion thereof into a TS packet and the transmission of the TS packet to the QAM, the interworking unit 310 transmits data 319 indicative of the correspondence for conversion between the novel IP address and a PID value and a TS packet transmission frequency (or QAM number) to the STB 305 through the QAM 304. In this case, it is required that a specified frequency (or QAM number) and a specified PID value with which the correspondence data between the IP address and the PID value and the TS packet transmission frequency (or QAM number) are transmitted should be set beforehand. In the case where the STB 305 receives a TS packet having the specified frequency (or QAM number) and PID value, there exists data indicative of the correspondence for conversion between the IP address and the PID value and the frequency (or QAM number) for transmission of TS packet and hence it is necessary to hold the data by use of a memory or the like in the STB 305. The STB 305 selects, on the basis of the transmitted data transmission frequency (or QAM number), a signal having a frequency at which desired data is transmitted and selects a TS packet having a PID value designated by the received correspondence for IP address to PID value conversion, thereby receiving the desired data. As mentioned above, each time the interworking unit 310 receives an IP packet having a novel IP address and performs the conversion thereof into a TS packet and the transmission of the TS packet, the interworking unit 310 transmits a frequency for transmission of TS packet and a PID value to the STB 305. Thereby, the STB 305 can receive a desired TS packet.

According to the present embodiment mentioned above, the PID value of a TS packet is formed from the IP address of an IP packet, the series of the IP address is defined from upper 24 bits of the IP address and a frequency for transmission of data is set for each IP address series. Thereby, the conversion between the IP address and the PID value is possible. Also, there can be obtained an effect that the number of users (or the number of IP addresses) subjected to multiplex transmission at one frequency can be set for each IP address series unit.

(Seventh Embodiment)

Figure 21:
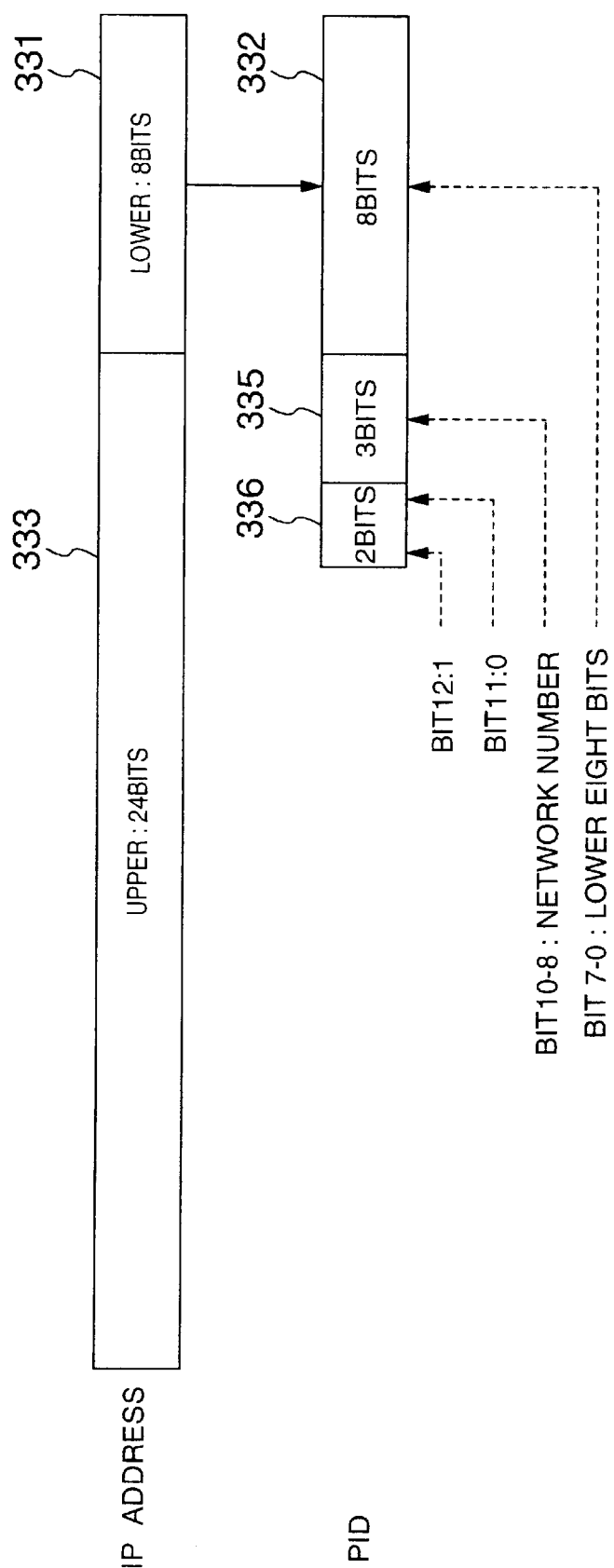
FIG. 21 is a diagram showing the correspondence between an IP address and a PID value in another embodiment of the present invention.

FIGS. 21 and 22 are diagrams showing the correspondence between the IP address of an IP packet and the PID value of a TS packet in a seventh embodiment of the present invention. FIG. 21 corresponds to the modification of the example shown in FIG. 17. As shown in FIG. 21, the value 331 of lower 8 bits (Bit: 7-0) of an IP address is converted into the value 332 of lower 8 bits (Bit: 7-0) of a PID value. The value 333 of upper 24 bits (Bit: 31-8) of the IP address is degenerated into a 3-bit value as a network number value for conversion into the 3-bit (Bit: 10-8) value 335 of bits 10 to 8 of the PID value. This will be mentioned later on in conjunction with FIG. 22. Also, it is shown in FIG. 21 that bits 12 and 11 of the PID value denoted by reference numeral 336 are fixed to 1 and 0, respectively.

FIG. 22 corresponds to the modification of the example shown in FIG. 18 and is a diagram showing that correspondence between the value 333 of upper 24 bits (Bit: 31-8) of the IP address, the 3-bit value 335 as a network number value and the value of a QAM number for output which is held in the LUT 323 shown in FIG. 16. In FIG. 18, the value 333 of upper 24 bits (Bit: 31-8) of the IP address is degenerated into 5 bits. In FIG. 22, however, it is degenerated into 3 bits. In FIG. 22, it is indicated that, for example, the IP address of 128.155.30.XXX series is converted into a network number 0 (000 in a binary number). Similarly, it is indicated that the IP address of 128.155.40.XXX series is converted into a network number 1 (001) and the IP address of 128.155.80.XXX series is converted into a network number 7 (111). By holding such a conversion table by the LUT 323 shown in FIG. 16, it becomes possible to convert the value 333 of upper 24 bits (Bit 31-8) of the IP address into the 3-bit value 335. In the example shown in FIG. 22, the description has been made in conjunction with the conversion of the value 333 of upper 24 bits (Bit: 31-8) of the IP address into the 3-bit value. However, as mentioned in conjunction with FIG. 18, in the case where the value of upper 16 bits (Bit: 31-16) of the IP address is of the same series, it is also possible to omit the upper 16 bits (Bit: 31-16) with the conversion table formed by use of only the remaining 8 bits (Bit: 15-8). Similarly to FIG. 18, FIG. 22 further shows the correspondence between the value 333 of upper 24 bits (Bit: 31-8) of the IP address and a QAM number for TS packet output. The way of utilizing this correspondence is the same as that described in conjunction with FIG. 18.

As mentioned above, 13 bits of a PID value are constructed such that bits 12 and 11 are respectively fixed to 1 and 0, bits 10 to 8 use 3 bits into which the value 333 of upper 24 bits (Bit 31-8) of an IP address is degenerated, and the value of bits 7 to 0 is set to be the same as the value 331 of lower 8 bits (Bit: 7-0) of the IP address. Since the upper 2 bits (Bit 12-11) of the PID value are thus fixed to 1 and 0, respectively, this construction can provide an effect that whatever values the value 333 of upper 24 bits (Bit: 31-8) of the IP address and the value 331 of lower 8 bits (Bit: 7-0) thereof are converted into, the conversion between the IP address and the PID value is possible without the overlapping with values which H.222.0 prescribes for use.

(Eighth Embodiment)

Figure 23:
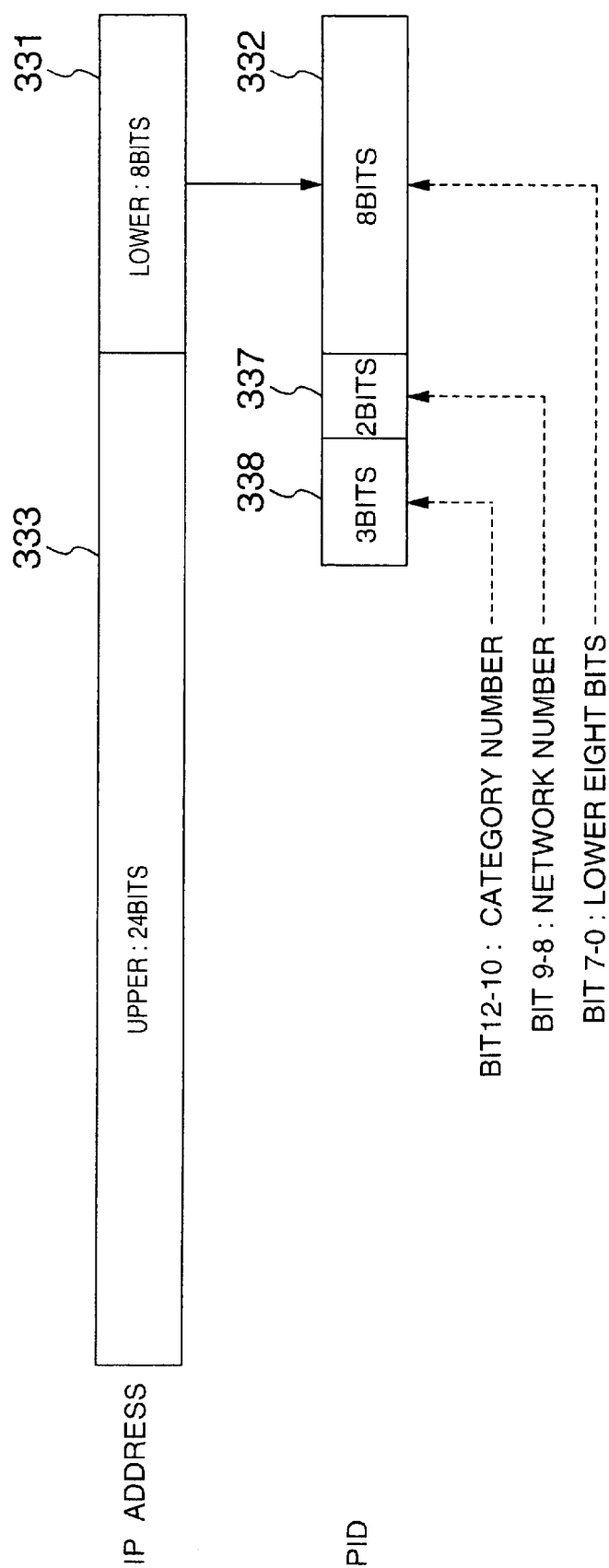
FIG. 23 is a diagram showing the correspondence between an IP address and a PID value in a further embodiment of the present invention.

FIGS. 23, 24 and 25 are diagrams showing the correspondence between the IP address of an IP packet and the PID value of a TS packet in an eighth embodiment of the present invention. FIG. 23 corresponds to the modification of the example shown in FIG. 17. As shown in FIG. 23, the value 331 of lower 8 bits (Bit: 7-0) of an IP address is converted into the value 332 of lower 8 bits (Bit: 7-0) of a PID value. The value 333 of upper 24 bits (Bit: 31-8) of the IP address is degenerated into a 2-bit value as a network number value for conversion into the 2-bit (Bit: 98) value 337 of bits 9 to 8 of the PID value. This will be mentioned later on in conjunction with FIG. 24. Also, a 3-bit value corresponding to the category of data is inserted as the 3-bit (Bit: 12-10) value 338 of bits 12 to 10 of the PID value. This will be mentioned later on in conjunction with FIG. 25.

FIG. 24 corresponds to the modification of the example shown in FIG. 18 and is a diagram showing that correspondence between the value 333 of upper 24 bits (Bit: 31-8) of the IP address, the 2-bit value 337 as a network number value and the value of a QAM number for output which is held in the LUT 323 shown in FIG. 16. In FIG. 18, the value 333 of upper 24 bits (Bit: 31-8) of the IP address is degenerated into 5 bits. In FIG. 24, however, it is degenerated into 2 bits. In FIG. 24, it is indicated that, for example, the IP address of 128.155.30.XXX series is converted into a network number 0 (00 in a binary number). Similar conversion is made for the IP addresses of 128.155.40.XXX series and 128.155.80.XXX. By holding such a conversion table by the LUT 323 shown in FIG. 16, it becomes possible to convert the value 333 of upper 24 bits of the IP address into the 2-bit value 337. In the example shown in FIG. 24, the description has been made in conjunction with the conversion of the value 333 of upper 24 bits (Bit: 31-8) of the IP address into the 2-bit value. However, as mentioned in conjunction with FIG. 18, in the case where the value of upper 16 bits (Bit: 31-16) of the IP address is of the same series, it is also possible to omit the upper 16 bits (Bit: 31-16) with the conversion table formed by use of only the remaining 8 bits (Bit: 15-8). Similarly to FIG. 18, FIG. 24 further shows the correspondence between the upper 24-bit (Bit: 31-8) value 333 of the IP address and a QAM number for TS packet output. The way of utilizing this correspondence is the same as that described in conjunction with FIG. 18.

FIG. 25 is a diagram showing the correspondence between the category of data and a 3-bit value as the category number value 338 shown in FIG. 23. In FIG. 25, it is indicated that for example, the case where the category of data transmitted by a received IP packet is video corresponds to 2 (binary number: 010) and the case where it is audio corresponds to 1 (binary number: 001). The correspondence between the category of data and the category number value (3 bits) shown in FIG. 25 is used, for example, in the case where PID values are set to different values in accordance with the category of data transmitted by the IP packet, as mentioned above. In the case where 0 (binary number: 000) or 7 (binary number: 111) is used as the category number value, the overlapping of the PID value and the value prescribed by H.222.0 for use may be generated in accordance with the network number value (2 bits) and the value of lower 8 bits, as in the case described in conjunction with FIG. 18. In such a case, therefore, it is necessary to consider a countermeasure such as the provision of a prohibition rule for avoiding the case where there overlaps the value prescribed by H.222.0 or the use of 1 to 6 as the category number value.

As mentioned above, 13 bits of a PID value are constructed such that bits 12 to 10 are set to the category number value (3 bits), bits 9 to 8 use 2 bits into which the value 333 of upper 24 bits (Bit 31-8) of an IP address is degenerated, and the value of bits 7 to 0 is set to be the same as the value 331 of lower 8 bits (Bit: 7-0) of the IP address. This construction can provide an effect that it is possible to make the IP address to PID value conversion in which the PID value can be set to a different value in accordance with the category of data transmitted by the IP packet.

According to the sixth to eighth embodiments described in the foregoing, the PID value of a TS packet is formed from the IP address of an IP packet, the series of the IP address is defined from upper 24 bits of the IP address and a frequency for transmission of data is set for each IP address series. With this construction, there can be obtained an effect that it is possible to make the one-to-one conversion between the IP address and the PID value and it is possible to set the frequency (or QAM number) for transmission of data for each IP address series unit, whereby the number of users (or the number of IP addresses) holding in common the amount of data capable of being transmitted at one frequency can be set for each IP address series unit. Also, with the construction in which 3 bits of the 13-bit PID are set to the category of data, it is possible to set the PID value of the TS packet after conversion in accordance with the category of data which is transmitted by the IP packet.

What is claimed is:

1. A CATV system comprising:
   a first CATV network for transmitting a digital video signal compressed in accordance with the Moving Picture Experts Group-2 (MPEG2) system;
   a second CATV network for transmitting a digital video signal compressed in accordance with the MPEG2 system;
   an Internet Protocol (IP) network using the IP prescribed by the Internet Engineering Task Force (IETF);
   a first interworking unit connected to said first CATV network and said IP network said first interworking unit converting the digital video signal transmitted in said first CATV network to a packet based on the IP and transmitting the packet to said IP network; and
   a second interworking unit connected to said second CATV network and said IP network, said second interworking unit converting the packet to a digital video signal compressed in accordance with the MPEG2 system and transmitting to said second CATV network the digital video signal converted thereto from the packet in said second interworking unit.

* * * * *